United States Patent [19]

Schimanski et al.

[11] Patent Number: 5,207,414
[45] Date of Patent: May 4, 1993

[54] MEDIA HANDLING SYSTEM FOR PHOTOPLOTTER AND METHOD OF USE

[75] Inventors: Freddie G. Schimanski, Madison; Jerome A. Majesty; Dana W. Seniff, both of South Glastonbury; Alan W. Menard, Bolton, all of Conn.

[73] Assignee: Gerber Systems Corporation, South Windsor, Conn.

[21] Appl. No.: 660,280

[22] Filed: Feb. 22, 1991

[51] Int. Cl.$^5$ .............................................. B65H 3/08
[52] U.S. Cl. .......................................... 271/5; 271/11; 271/164; 271/227; 271/236
[58] Field of Search ............................. 271/5, 11-13, 271/227, 236, 238, 239, 164

[56] References Cited

U.S. PATENT DOCUMENTS

| 4,023,789 | 5/1977 | Touchette | 271/236 X |
| 4,565,443 | 1/1986 | Yazaki | 271/5 X |
| 4,571,073 | 2/1986 | Diedrich | 271/5 X |
| 4,651,984 | 3/1987 | Emrich | |
| 4,677,303 | 6/1987 | Erdman | 271/236 X |
| 4,815,721 | 3/1989 | Morgan | 271/5 X |

FOREIGN PATENT DOCUMENTS

| 0030646 | 6/1981 | European Pat. Off. . |
| 0367561 | 5/1990 | European Pat. Off. . |
| 1459572 | 12/1976 | United Kingdom . |
| 2041336 | 8/1980 | United Kingdom . |

Primary Examiner—Richard A. Schacher
Attorney, Agent, or Firm—McCormick, Paulding & Huber

[57] ABSTRACT

In a light-tight photoplotter, a system handles sheets of photosensitive media from an initial supply location through the photoplotter and advances them to final a location. The system includes a loading device interposed between the supply location and a workpiece support surface on which surface a work operation is conducted on the involved media sheet. It further includes an off-loading device positioned at the opposite end of the workpiece support surface and the collecting location. The loading device includes a locating mechanism which allows the involved media to be precisely oriented on the workpiece support surface in registry with two orthogonally oriented coordinated axis. The system further permits loading and unloading of covered cassettes in daylight without exposing the media supply to light which might otherwise be cast onto it. The system further provides for the safety locking of stacked media within the photoplotter to prevent inadvertent removal.

71 Claims, 18 Drawing Sheets

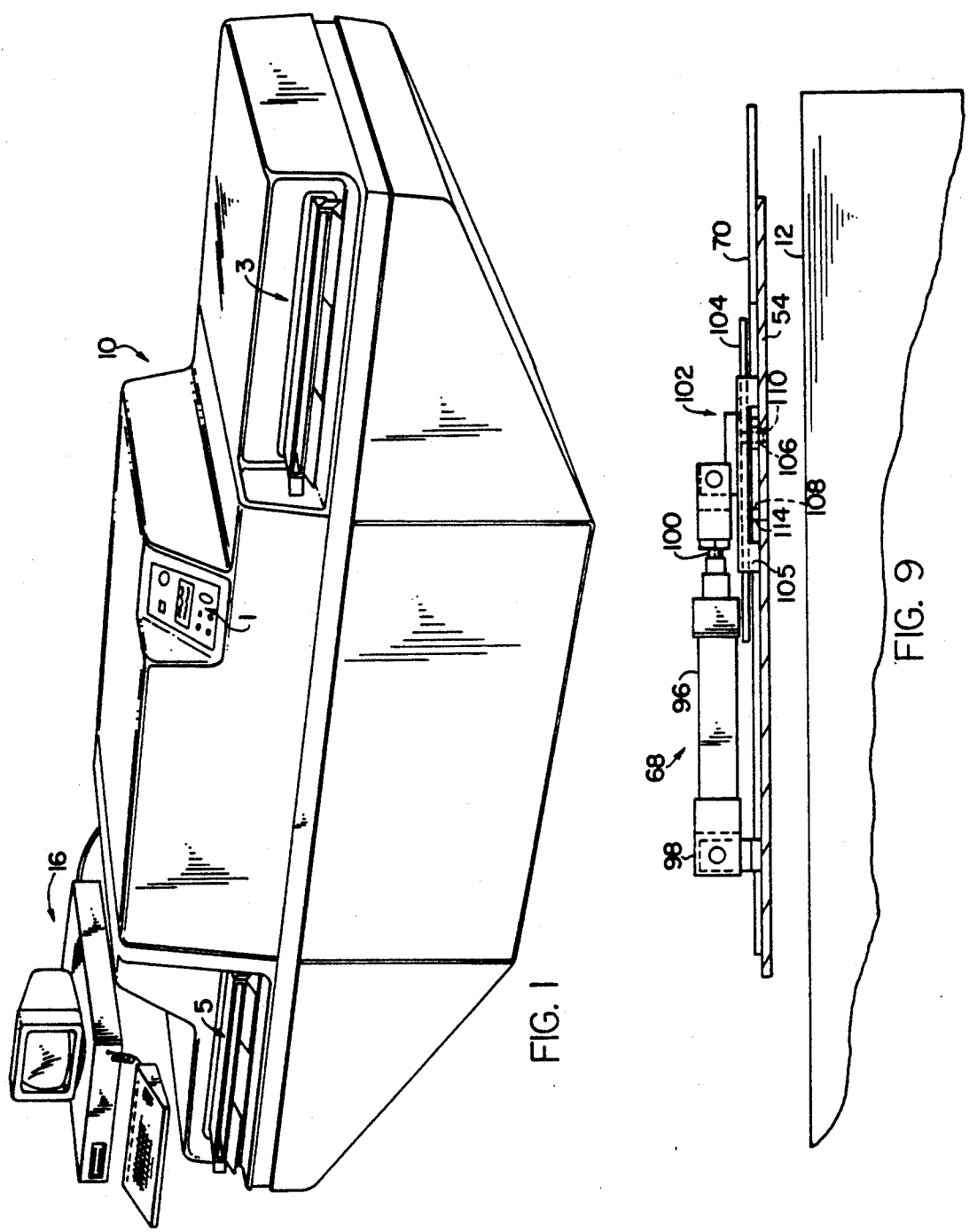

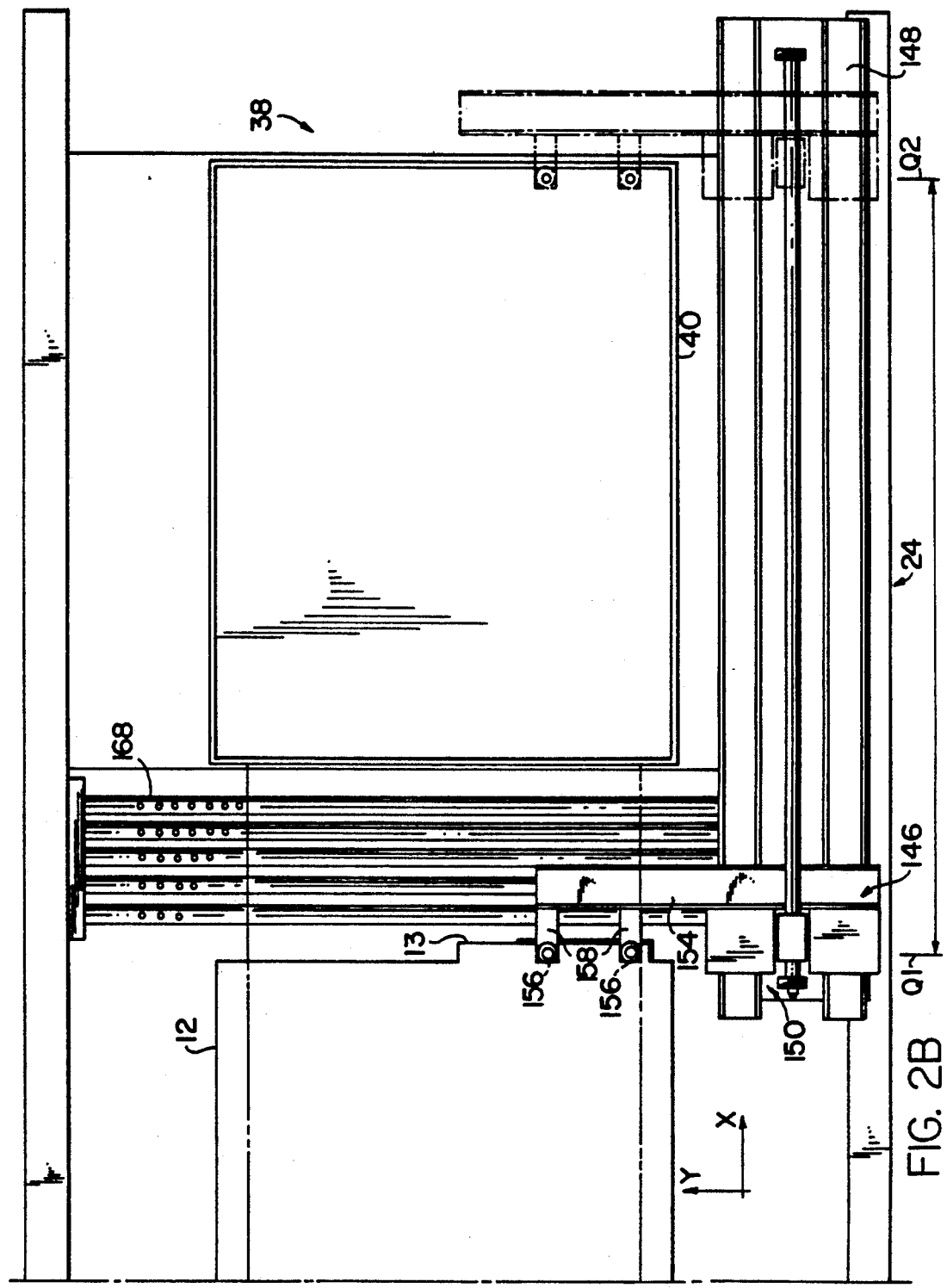

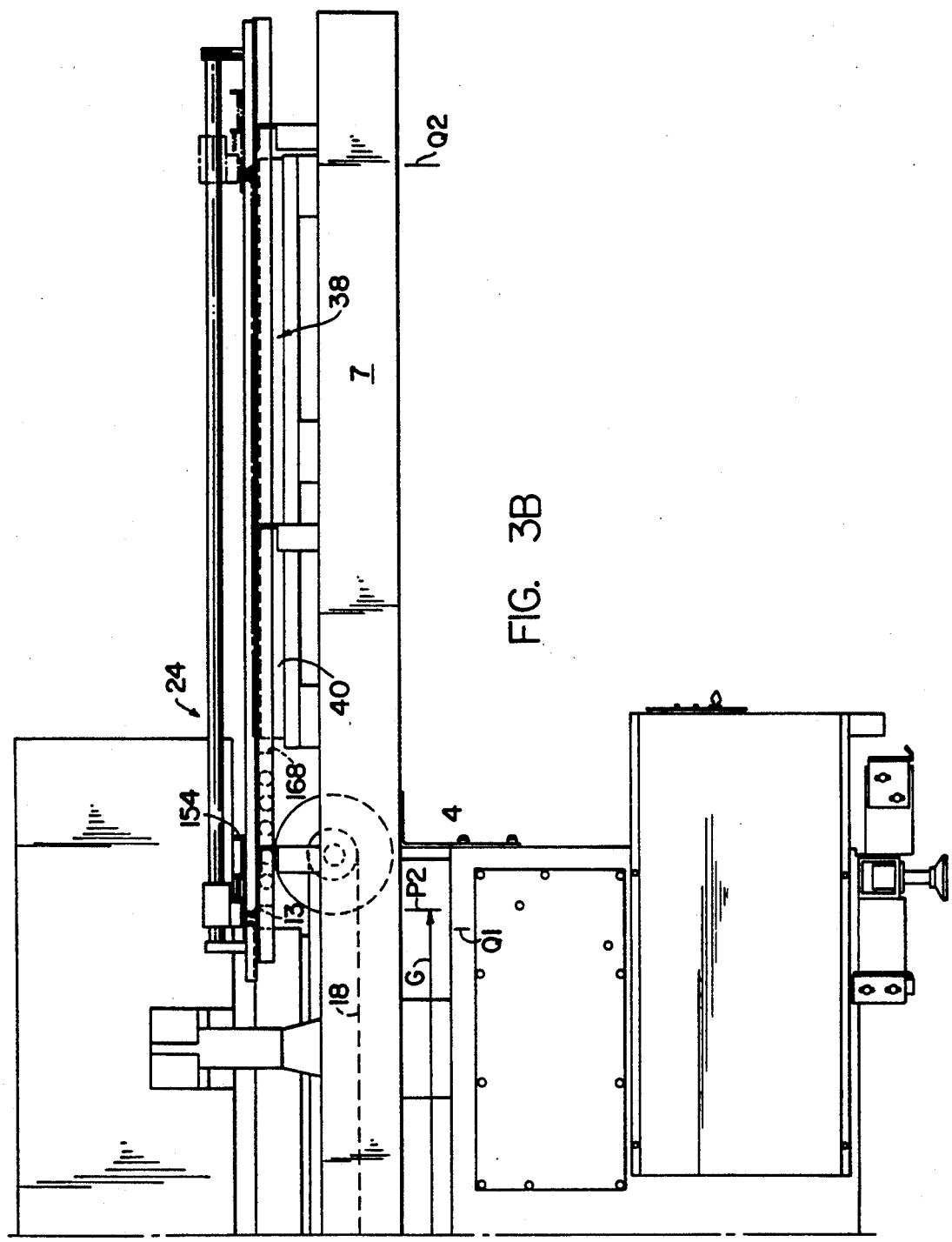

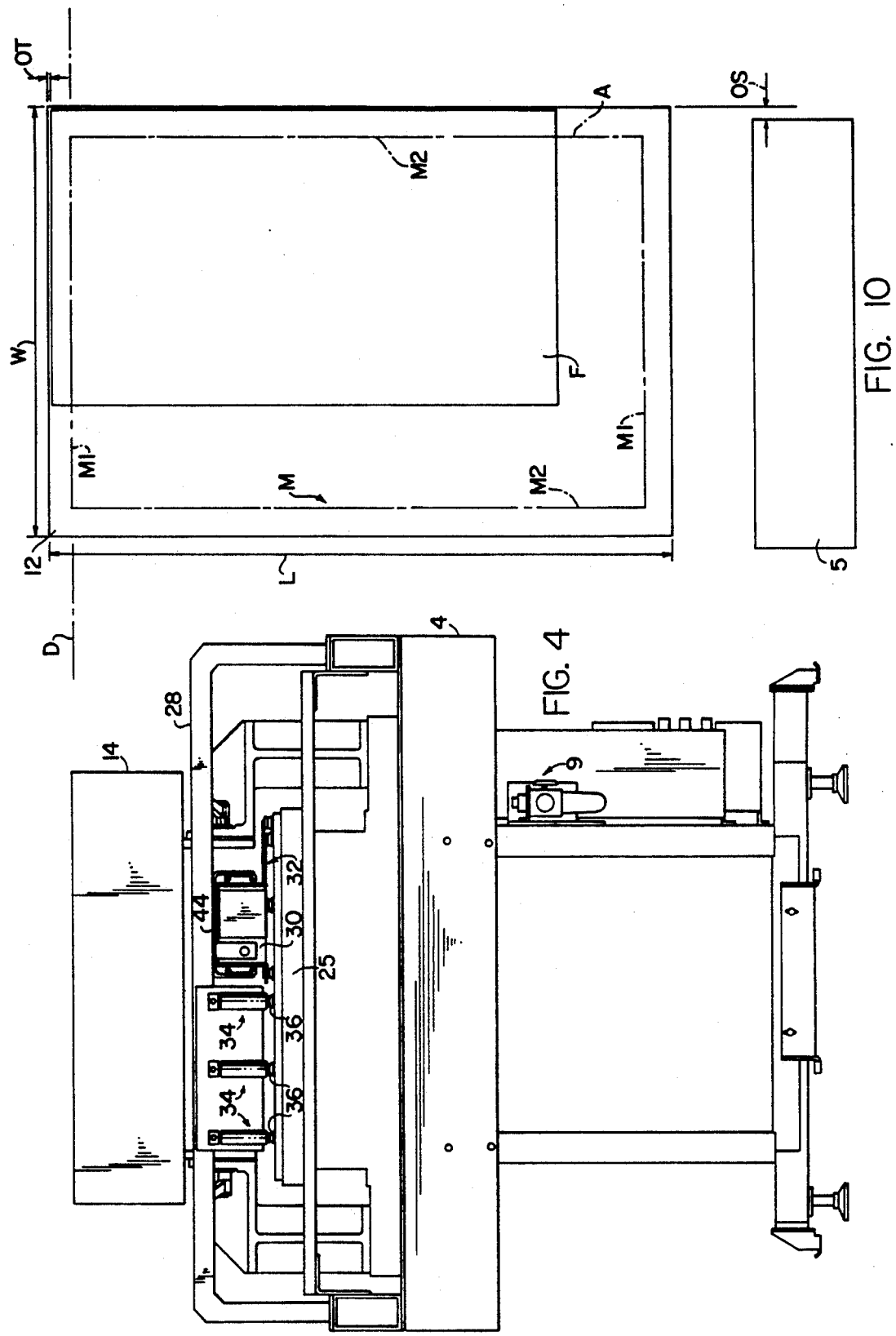

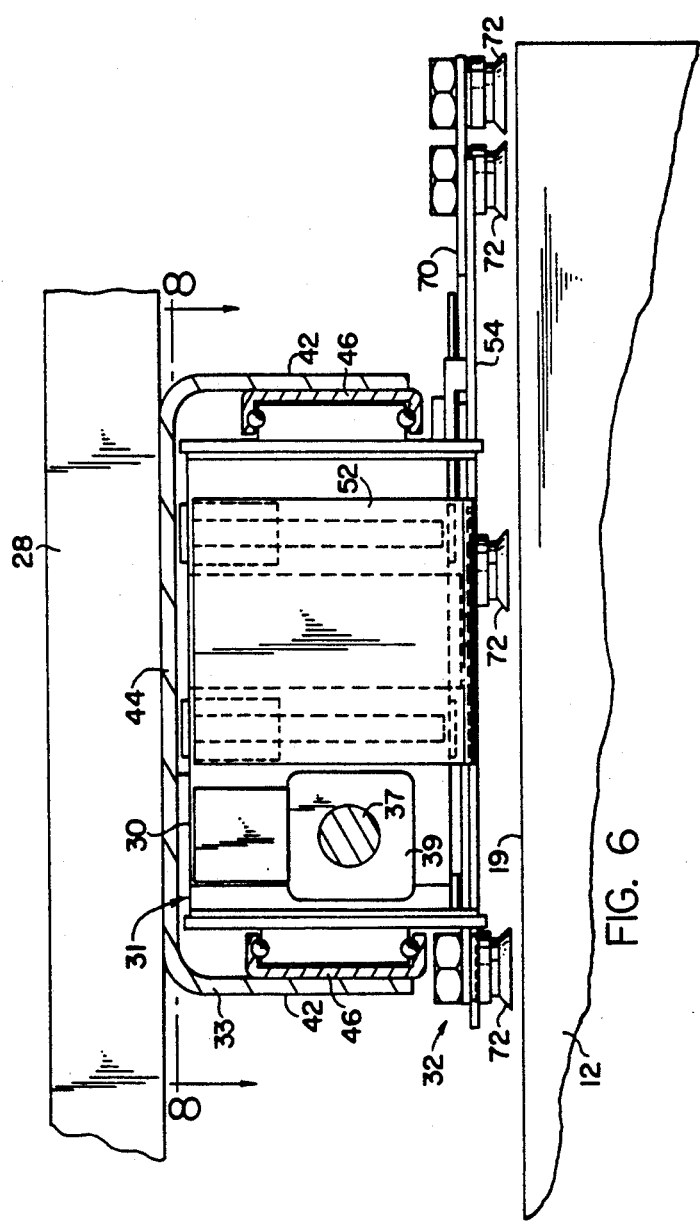
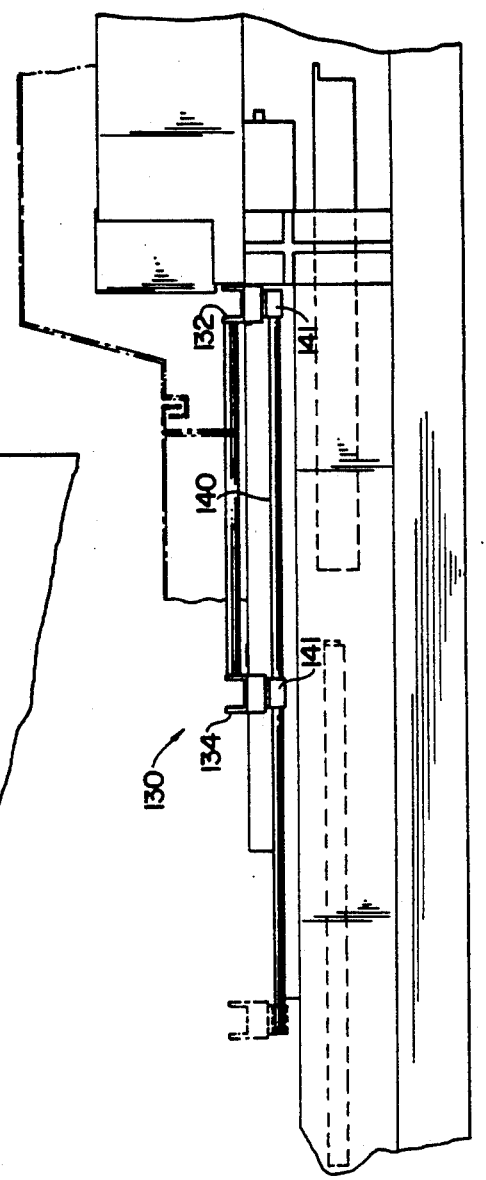

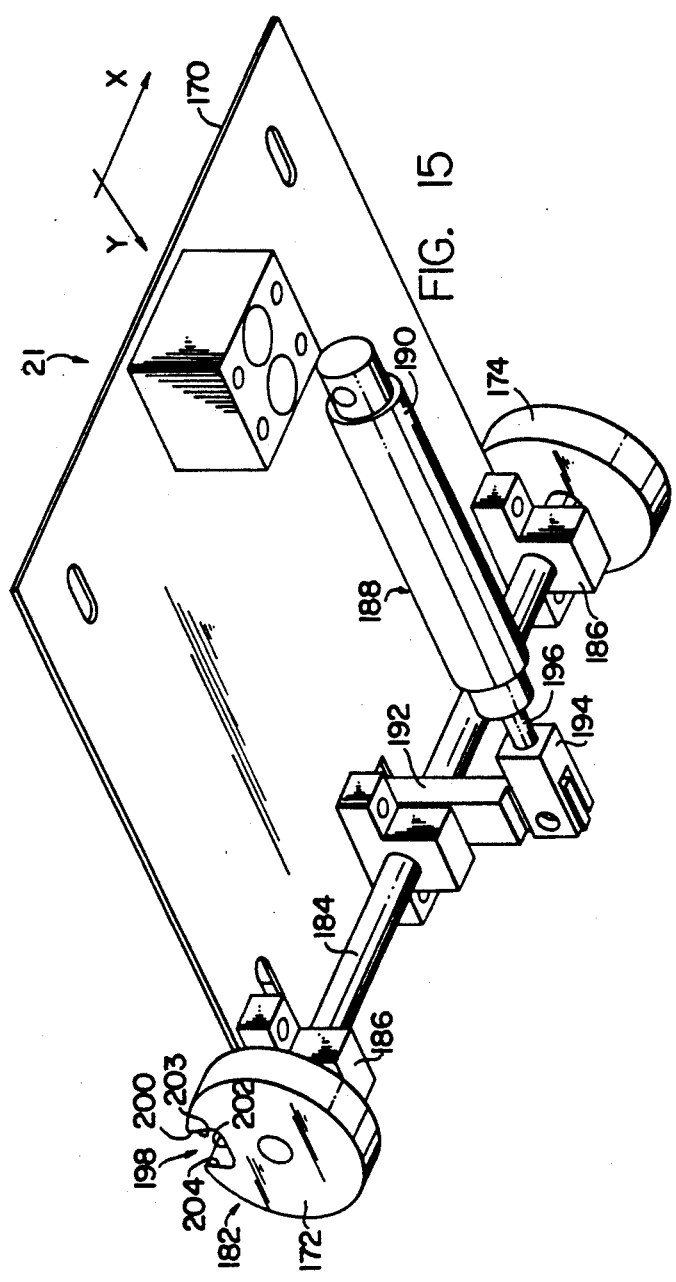
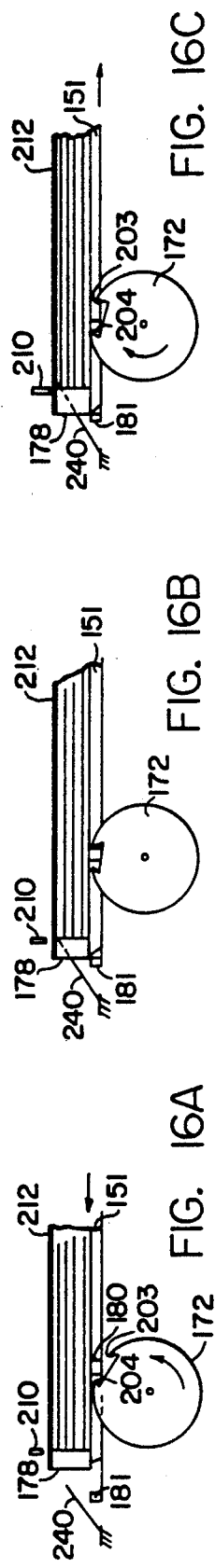

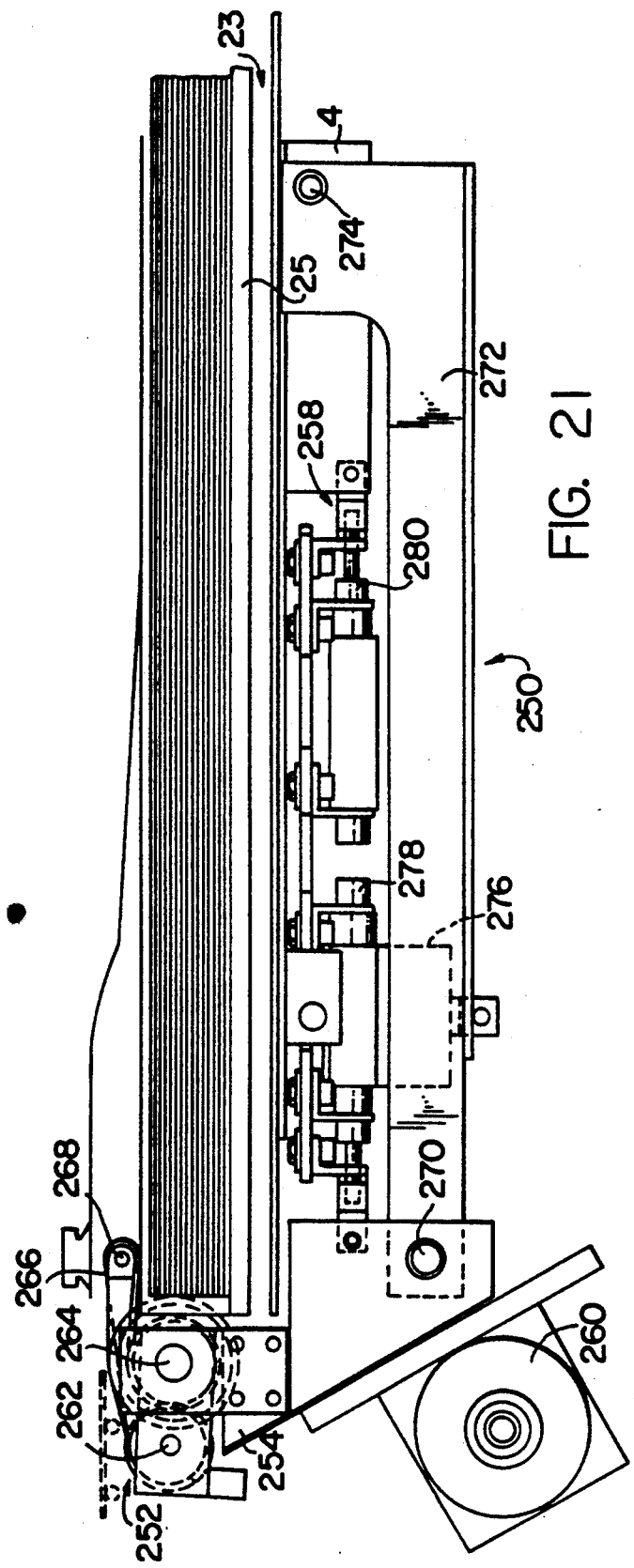

5,207,414

MEDIA HANDLING SYSTEM FOR PHOTOPLOTTER AND METHOD OF USE

BACKGROUND OF THE INVENTION

This invention relates to an article handling means for automatically moving an article from one location to another, and deals more particularly with a media handling system for use in a photoplotter wherein means are provided for advancing media sheets through the photoplotter in succession such that each sheet is automatically placed onto a workpiece support surface in registration with a predetermined orientation so that a work operation can be conducted on it.

In an automated photoplotting system, there is a clear need to provide a handling device which moves the media with such precision as to replicate the movements of an operator who would otherwise be involved in placing the media in precise registration on the workpiece support surface. Such media handling devices further must possess a high degree of reliability and are expected to perform without failure over a several operations. Additionally, such media handling devices must be readily adaptable to handle a high variety of media comprised of different substrate material, such as aluminum, plastic or paper, upon which the photosensitive film is applied. Such substrates may also vary in thickness thereby giving each a different behavioral characteristic when moved. In addition to material type and thickness, these media handling systems must be adaptable to handle a number of differently sized sheets which may be required for a given work operation.

It is also generally desirable to reduce the amount of handling done by an operator on the media in loading and positioning it on the support surface as well as in off-loading it from the support surface. This tends maximize the number of plotting operations which can be accomplished in a given interval by the plotter by eliminating the time which would otherwise have been spent physically handling the media.

Photoplotters which do not utilize light-tight coverings for preventing unwanted or stray light from inadvertently being cast onto the photosensitive media being worked on require that an operator who is conducting the work operation on the photosensitive media operate such plotters in what is commonly known as a "dark room" illuminated only by very dim red lighting which prevents exposure of the photosensitive media to any light other than that which is precisely cast upon it by the light beam generated in the photoplotter. Thus, during successive plotting operations, the dark room must remain sealed against entry and exiting to avoid violating the dimly lit work environment. Light-tight photoplotters allow a photoplotting operation to be conducted in the natural light of a work environment, thus permitting an operator to be free from the aforementioned drawbacks heretofore associated with operating in a "dark room".

While a covered photoplotter is for the most part light-tight, it is conceivable that during the loading and unloading operations in a normally lighted environment, a supply of the photosensitive media handled outside the plotter might be accidentally exposed prior to or subsequent the work operation being conducted by it. Therefore, such media handling devices need to be capable of protecting a media supply from exposure to outside light even during these operations thereby further allowing the operator the freedom to work in natural light.

Accordingly, it is an object of the present invention to provide a media handling system employed in a photoplotter wherein means are provided for advancing one of a plurality of supplied media sheets onto a work surface which supports it in precise registration with a specified reference location thereon and for moving the involved media sheet off the work surface and to a collecting or receiving location after a work operation has been conducted on it.

It is another object of the present invention to provide a media handling system of the aforementioned type capable of accomplishing successive work operations on a plurality of media sheets supplied to the photoplotter within in a light-tight cover encasing the photoplotter.

It is yet a further object of the present invention to provide a media handling system of the aforementioned type capable of handling a variety of media constituted by different substrate materials having different sizes and thickness for advancement onto and off of the work support surface.

It is still a further object of the present invention to provide in a photoplotter a media handling system of the aforementioned type wherein manual handling or manipulation by an operator of the media is eliminated except for during loading and unloading operations.

It is also an object of the present invention to include as part of a media handling system some a means for insuring that a supply of media is not inadvertently exposed to light while it is disposed outside of the photoplotter.

Further objects and advantages of the invention will become apparent from the following disclosure and the appended claims.

SUMMARY OF THE INVENTION

An article handling system and related method for moving an article along a path of travel from an initial position to a final position includes a base, a support surface supported by the base, a loading means and an off-loading means for successively advancing articles across the support surface where a work operation is conducted thereon.

The loading means is associated with one side of the support surface and is supported for movement above the surface for advancing one of a plurality of such articles onto the support surface from a position located generally adjacent the one side of said surface. The loading means further including a means for automatically advancing one of the plurality of articles onto the support surface so as to position it thereon in a preselected orientation.

The off-loading means is associated with the other side of the support surface and advances the one of the plurality of articles from the support surface and to a next location oriented on the other side of the of the support surface. The system further includes control means for coordinating the movements of the loading means and the off-loading means relative to one another to successively advance one of the plurality of articles onto and off the support surface and for automatically effecting registration of the involved article being advanced in the given orientation on said support surface such that a work operation can be conducted on it.

The invention further resides in a method for advancing media material in sheet form through a photoplotter. This method includes providing a supply means and a collecting means and locating each on opposite sides of the support surface and moving the support surface to a position adjacent the supply means and utilizing the loading means to advance a media sheet from the supply means and onto the support surface such that the media sheet is automatically located on the workpiece support surface in registration with a given orientation. A work operation is next conducted on the media sheet while being supported on the support surface and the support surface is moved to a position adjacent the collecting means after the work operation is completed on the involved media sheet and the off-loading means is subsequently utilized to advance the involved media sheet off of the support surface and into the collecting means.

BRIEF DESCRIPTION OF THE DRAWINGS

FIG. 1 shows a perspective view of the light-tight photoplotter embodying the present invention.

FIGS. 2A and 2B when place side by side illustrate in plan view the media handling system employed in the photoplotter of FIG. 1 with the cover removed.

FIGS. 3A and 3B when placed side by side illustrate the system of FIGS. 2A and 2B in side elevation view.

FIG. 4 is an end elevation view of the system shown in FIGS. 3A and 3B looking at it from the left.

FIG. 6 is a vertical sectional view through the channel supporting the first carriage and shows the docking assembly in its raised position.

FIG. 9 is a vertical sectional partially fragmentary view along line 9—9 in FIG. 8 showing in detail the locating mechanism.

FIG. 10, shows schematically the dimensional relationships between a media sheet F as it is supported by the surface of the platen relative to other parts in the system.

FIG. 13 is a side elevation view of the support system shown in FIG. 11.

FIG. 15 is a perspective view of the cassette locking means as seen from the bottom.

FIGS. 16A-16C illustrate the three different modes of operation of the locking means of FIG. 15.

FIG. 21 is a vertical sectional view taken through a supply cassette and shows a paper sheet removing means.

DETAILED DESCRIPTION OF THE PREFERRED EMBODIMENT

Figure 2A:
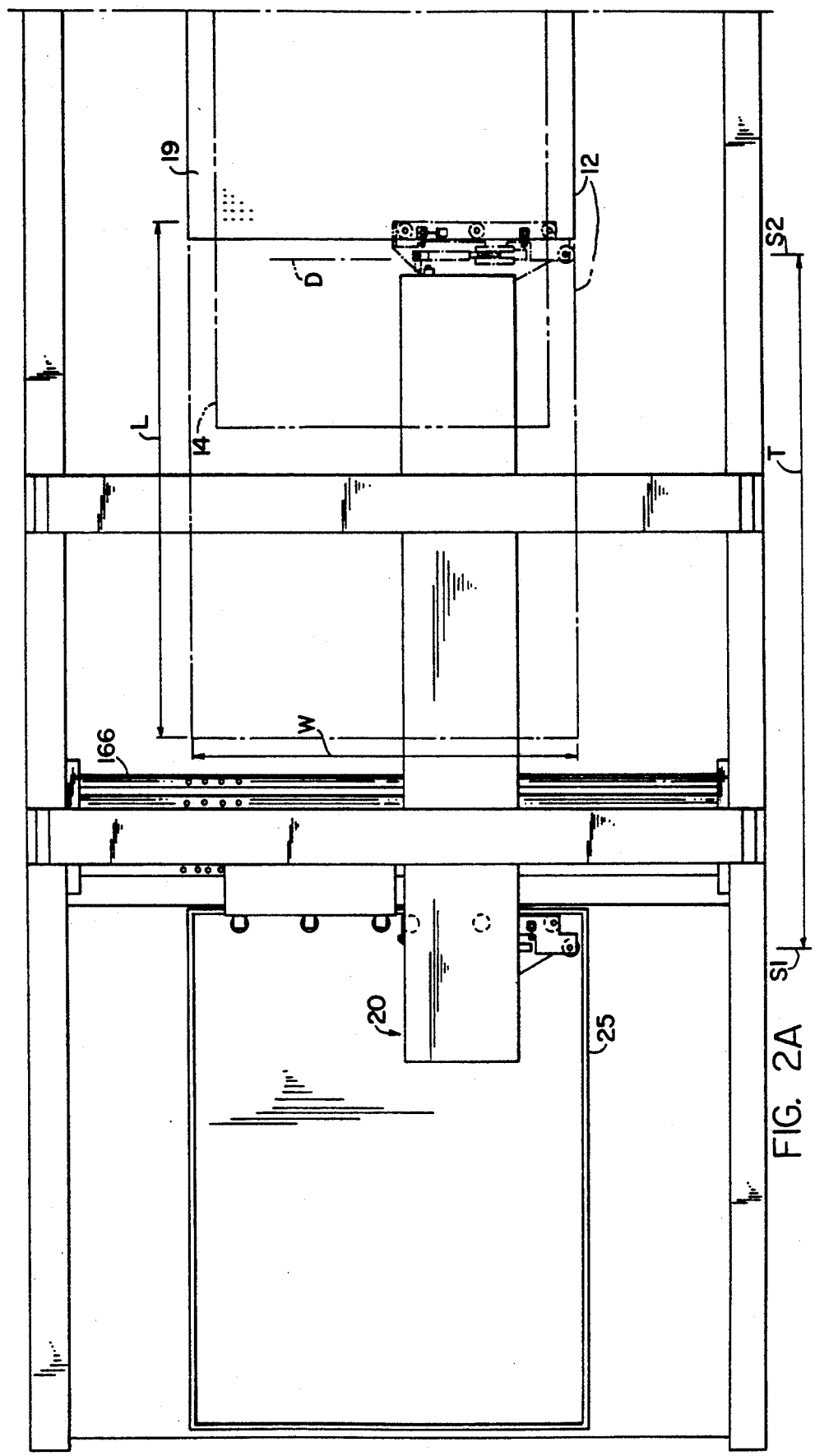

FIG. 1 shows a photoplotter indicated generally as 10 of the type with which the present invention is concerned for automatically recording a plot of graphic information on a sheet of photosensitive material. The plotter includes a covering enclosing the instrument within from radiant energy and has two openings 3 and 5 formed in it through which media is respectively supplied and removed in accordance with one aspect of the invention. Each of the openings 3 and 5 is provided with conventional seal means which allow the media to be passed between the internal environment of the photoplotter and a lighted external environment without inadvertent passage of light therethrough. The photoplotter also includes a computer interface linking it to an appropriate computer or controller 16 which carries out operations in accordance with instructions read from memory. A control panel 1 is provided for enabling a user to control basic functions of the plotter 10, such as during loading and unload of the media, or permitting the operator to quickly stop the machine in case of an emergency.

The photoplotter 10 as shown in FIGS. 2-6 includes a base 4, a platen 12 capable of being moved relative to the base along the indicated X coordinate direction on highly precise ways supported by and extending on the base generally parallel to this direction, and a radiant energy emitting means indicated generally as 14 supported by the base above the platen 12. The means 14 is capable of projecting a beam of light onto a media sheet F positioned below it and is so located as to define a single line or datum D extending generally parallel to the indicated Y coordinate axis. While capable of taking other forms, the means 14 in the preferred embodiment is a laser scanning module 15 capable of exposing graphic information on the media sheet F in raster format across its surface along a line coincident with the datum line D.

The platen is moved linearly along the X coordinate direction relative to the laser 14 by a drive motor connected to it through the intermediary of a drive belt 18. The platen drive motor and the laser module 15 are linked to the computer 16 such that the movement of the platen 12 is coordinated with a desired beam pattern currently projected by the laser module 15 along the datum D thereby creating the desired graphic on the media surface F. The platen is one such as disclosed in U.S. Pat. No. 4,963,217 issued to Robert Pavone on Oct. 16, 1990 and entitled METHOD OF MAKING A PLANAR WORK SURFACE, which patent being commonly assigned to the assignee of the present invention. The platen 12 has a substantially planar upper work support surface 19 which includes a plurality of equidistantly spaced pin openings formed in it. A means 9 for pressurizing air either negatively or positively is provided as part of the photoplotter and is connected to the platen by a flexible hose to move the air in either direction through these openings to either draw the media downwardly onto the surface, or support it above the surface on a cushion of air in a manner that will heretofore become apparent.

The system embodying the present invention further includes a media loading means 20 for advancing a single media sheet from a first location 6 onto the platen 12 in precise registration with the datum D and further includes a media off-loading means 24 spaced from the first location and positioned on the other side of the platen 12 for moving the involved media off the platen 12 to a second location 7 after a work operation has been performed on the media sheet. The platen 12, taken from its leading edge 13, is driven by its associated drive motor between a first position P1 wherein the platen is located adjacent the media loading means 20 and a second position P2 wherein it is located adjacent the media off-loading means 24 thereby defining a length of travel indicated by the dimension F. In its initial P1 position, the leading edge 13 of the platen is positioned just after the datum D such that a portion of the surface 19 extends beyond the line at which the graphic begins. For purposes of discussion, it should be appreciated that the work surface 19 presents an area defined by a length dimension L equal to approximately 28 inches and a width dimension W equal to approximately 22 inches, but that the effective plotting area A on the surface 19 is somewhat less than the total area presented by it. That is, the beam path generated by the laser 14 along the datum D does not span the entire width W of the surface 19, but rather only about 20 inches of this dimension and that the maximum number of raster lines which can be generated along the X coordinate axis is limited to about 26 inches. As seen more particularly in FIG. 10, this creates a generally rectangular margin M of unplotable area about the support surface 19 as defined by the end margin portions M1 and the side margin portions M2. The presence of this peripheral margin is an important aspect in the handling process because it allows a region on each media sheet to be handled without interfering with the area upon which a graphic is created.

The media loading means 20 includes a first receptacle means 23 associated with the opening 3 for receiving in locking engagement therewith a supply cassette 25 in which is contained a plurality of stacked unexposed media sheets F. For advancing individual ones of the media sheets from the supply cassette, a first carriage 30 is provided and is supported for movement in the indicated X coordinate direction above the receptacle means 23 and the platen 12 by a support system 28 mounted to the base 4. The carriage 30 carries a depending vertically moveable docking assembly 32 for engaging with and moving a media sheet from the supply cassette 25 onto the platen 12. The loading assembly 20 also includes a plurality of lifting members 34 each being comprised of a body portion secured to the support 28 and an associated suction element 36 vertically moveable relative to it. For purposes of illustration, in FIGS. 2–5, the support 28 system is shown schematically, but as will hereinafter become apparent with reference to FIGS. 11–13, it is removably connected to the base 4 in accordance with a further aspect of the invention.

Turning now to FIGS. 6–9, and in particular to the structure for supporting the docking assembly 32 for both vertical and horizontal movement relative to the base 4, it should be seen that the first carriage 30 is made to travel along a means 31 secured to the support 28 in order to move the docking assembly between two horizontally discrete positions. This means includes an inverted U-shaped channel 33 extending parallel to the indicated X coordinate axis and defined by a bridging portion 44 from which depends two lateral side walls 42,42 along which ways 46,46 are provided. The ways 46,46 extend lengthwise a sufficient distance to allow the carriage 30 to move the docking assembly 32 through a range of travel G as defined by an initial S1 position coinciding with the assembly being located over the inwardly most extent of the first receptacle means 23 and by a final docked position S2 coinciding with the assembly being located proximate the leading edge 13 of the platen 12 when it is positioned at its P1 location. For moving the carriage 30 through the distance T in either direction, a conventional linear drive 48 is provided which includes a rod 37 secured to the channel 33 along which a travelling member 39 connected to the carriage 30 moves. The drive may be actuated by a number of different sources, but in the preferred embodiment of the invention, it is pneumatically driven.

A generally L-shaped member 58 connects the docking assembly 32 to the carriage 30 such the member 58 is movable vertically between a raised and a lowered position by an actuator 60 interposed therebetween. The L-shape of the member 58 is defined by a vertical portion 52 and a horizontal portion 54 integrally connected to one another at a right angle. To constrain the member 58 against unwanted lateral movement, the upstanding portion 52 has two outwardly extending T-shaped projections received within correspondingly sized and shaped tracks 64,64 formed in the carriage 30. The actuator 60 includes a depending rod 66 reciprocated between a retracted and extended position and is secured at its free end to the horizontal portion 54 of the L-shaped member for movement therewith.

The docking assembly 32 includes a locating mechanism 68, a slide plate 70 connected to and cooperating with the locating mechanism 68, a plurality of suction elements 72,72 depending from and carried by the slide plate 70 and a means cooperating between the slide plate and the horizontal portion 54 for yieldably effecting registration of the media sheet along both X and Y coordinate axes. The horizontal portion 54 of the L-shaped member 58 underlies and supports the slide plate 70 and has a plurality of cut outs 74,74 each associated with one of the suction elements 72,72 allowing them to pass unobstructively through and beyond the horizontal portion 54 of the supporting member 58. The cut outs 74,74 are sufficiently sized to allow free movement of the portion of each suction element which connects it to the plate 70 in any combination of directions along the X and Y coordinate axes.

Fixed to and extending upwardly from the horizontal portion of the member 58 are a plurality of locating pins 76,76 which communicate through and beyond associated square-like openings 78,78 formed in the overlying slide plate 70. The slide plate is upturned at 82,82 providing thereat an attachment point for an associated tension spring 80,80 linked to it at one end and at its other opposite end to the corresponding one of the locating pins 76,76. This consequently normally biases the slide plate 70 towards the pins 76,76 in the direction indicated by arrow 90. The slide plate 70 has a further upturn at 88 located generally perpendicularly to at least one of the upturns 82,82 and is connected to its associated pin by a tension spring 92 such that the slide plate 70 is also biased in a direction along the Y coordinate axis toward a leftmost position as illustrated by arrow 94. As will hereinafter become apparent, the square openings 78,78 are sized relative to the diameters of the pins 76,76 so as to allow the plate slide 70 to freely move relative to the supporting member 58 in a given range of movement to allow squaring of the corner edges of the media sheet with those of the platen 12 regardless of whether the involved media sheet is somewhat skewed during its advancement.

The locating mechanism 68 includes a horizontally disposed actuator 96 secured against movement at end 98 to the horizontal portion 54 of the L-shaped member 58 and at its opposite end is connected for movement to a follower means 102 through the intermediary of an actuated rod 100. The follower means 102 includes a mounting plate 104 supported above the horizontal portion 54 for relative movement therewith on block members 105 maintaining it in vertically spaced relation therewith. The slide plate 70 extends at 114 inwardly from its leading edge such that it is surrounded but not confined by the block members 105,105. A generally triangular opening 108 having a cam surface 118 is formed in the extension 114 and receives a pin 106 depending from the slide plate 104. The lowermost end of the pin 106 is received within a transversely extending slot 110 formed in the horizontal portion of the member 58 and is prompted to move against the camming surface 118 in a direction parallel to the indicated Y coordinate axis by the actuator 96. As will hereinafter become apparent, the means 102 is important because it allows the slide plate 70 to seek a final orientation with respect to the indicated X and Y coordinate axes during the final steps of the docking procedure.

The docking assembly 32 cooperates with stop means carried by the platen 12 for locating the rightmost corner of the media sheet F in registration with the same underlying corner on the platen 12. This means includes a moveable stop 120 mounted adjacent the leading edge 13 of the platen 12 and is selectively driven by an actuator 122 between a rest position wherein the stop is located below the work surface 19 and a raised condition wherein the stop 120 is moved by the actuator 122 above the surface 19 to present a front abutment along a path coincident with the media advancement direction. A side abutment 124 is provided on the right side wall of the platen and extends above the work surface 19 to present a lateral stop for insuring registration of the media right edge with the indicated X coordinate axis. Since the media is advanced along a path extending generally parallel to the indicated X coordinate direction, it is not therefore necessary to provide the abutment 124 with a means for moving it vertically below the work surface 19 in order to allow the media to advance off the platen.

As shown in FIG. 10, the platen 12 is supported on the base 4 such that its rightmost side edge is slightly inwardly laterally offset relative to the corresponding edge of the supply cassette 25 by a dimension indicated as OS. While only having a value of between an ⅛ and ¼ inch, this dimension is important in that it permits the locating mechanism 68 to effect final movement of the media sheet F in the Y coordinate direction to positively locate the confronting media sheet edge with the side abutment 124. Similarly, the first carriage range of travel T in the X coordinate direction stops short of the platen leading edge 13 by a dimension illustrated as OT. In the preferred embodiment of the invention, the dimension OT is substantially equal to that of the dimension OS thus allowing the cam follower means 102 to effect final positioning of the media sheet in registration with both the X and Y coordinate axes. That is, once the first carriage 30 is moved to its S1 limit, the actuator 96 is caused to prompt the pin 106 to move it from its retracted position wherein it is drawn tightly against the cam surface 118 by the springs 80,80 to an extended position wherein the slide plate 70 is allowed to extend in each coordinate direction towards respective ones of the stops 120 and 124 thereby effecting two axes motion to occur virtually simultaneously in order to accomplish right justification of the media sheet F on the platen 12. This right justification feature allows media sheets having a variety of different sizes to be uniformly located in registration with the datum D once advanced onto the support surface 19. This insures that any sized media sheet will be located within at least a portion of the plotting area A except for along margin portions M1 and M2.

Figure 11:
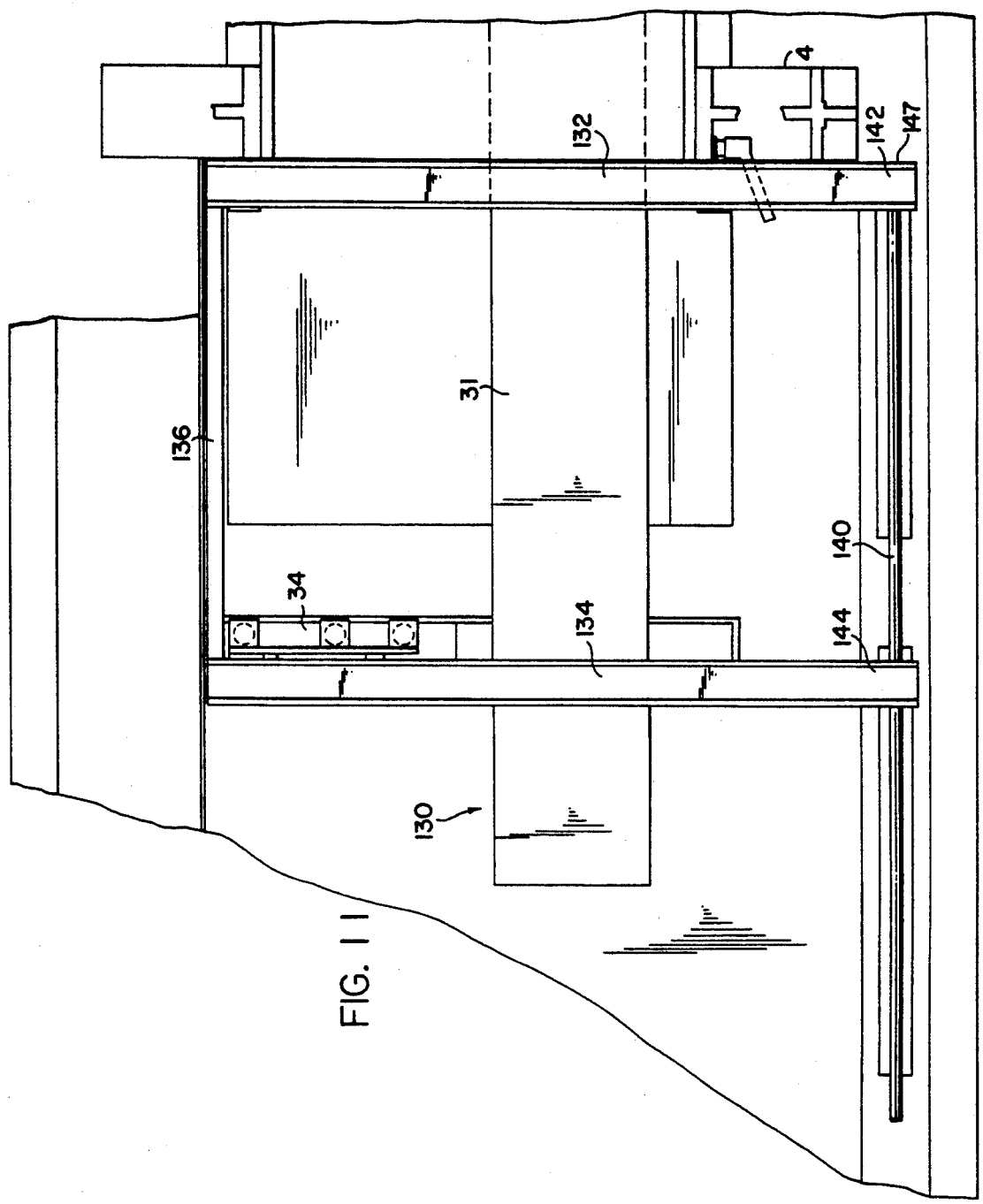
FIG. 11 is a top plan view of the support system removably securing the loading means to the base of the photoplotter.
Figure 12:
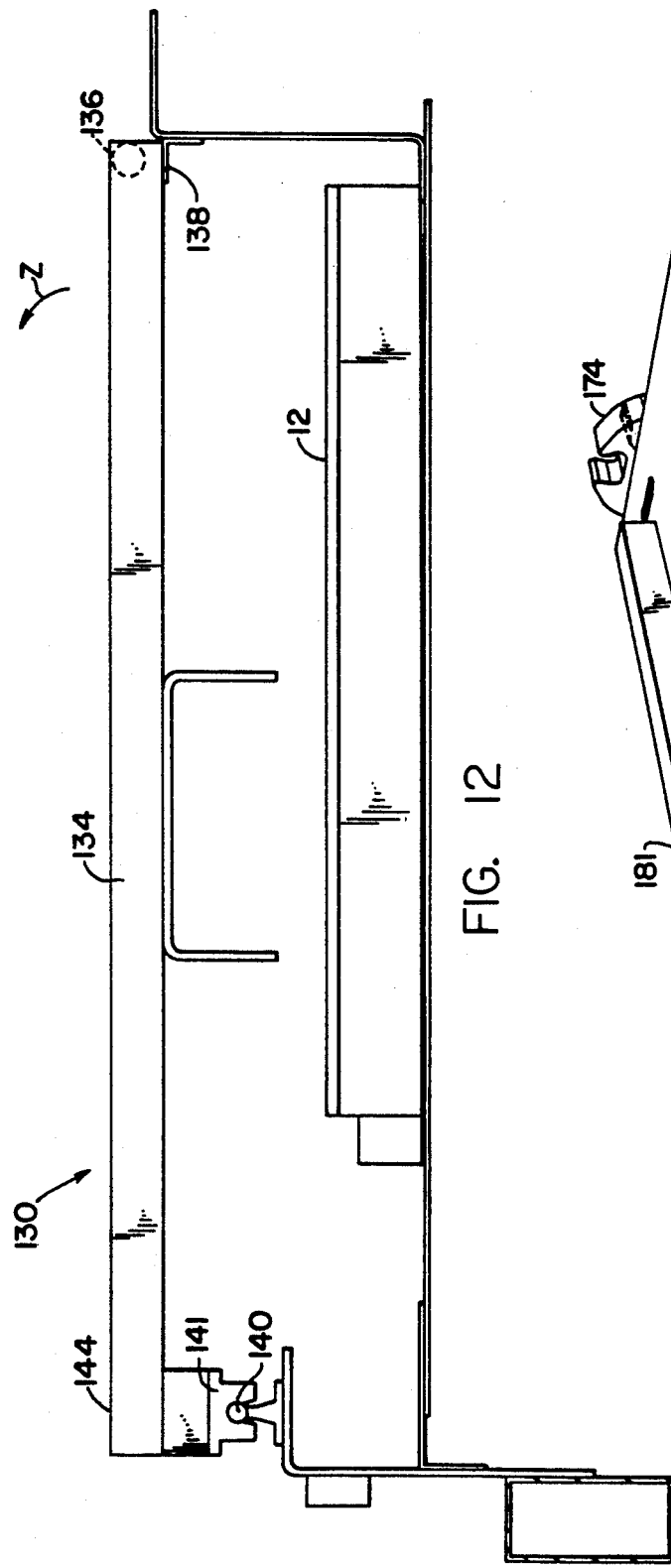
FIG. 12 is an end elevation view the support system shown in FIG. 11 looking at it from the left.
Figure 14:
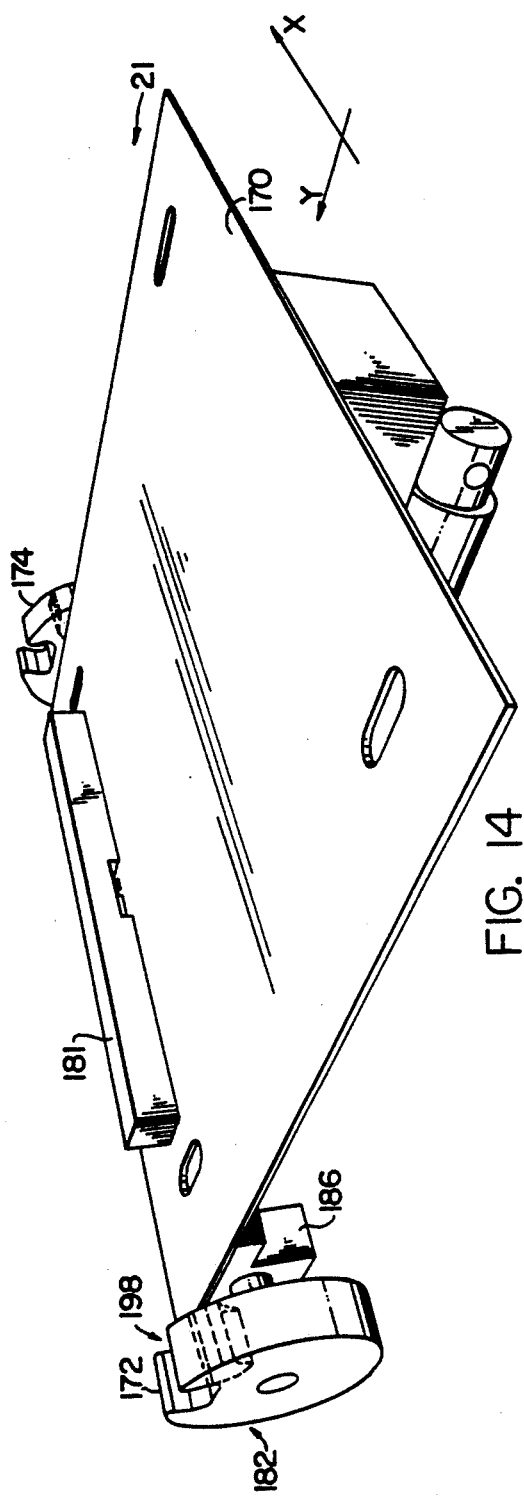
FIG. 14 is a perspective view of the cassette locking means as seen from the top.
Figure 17:
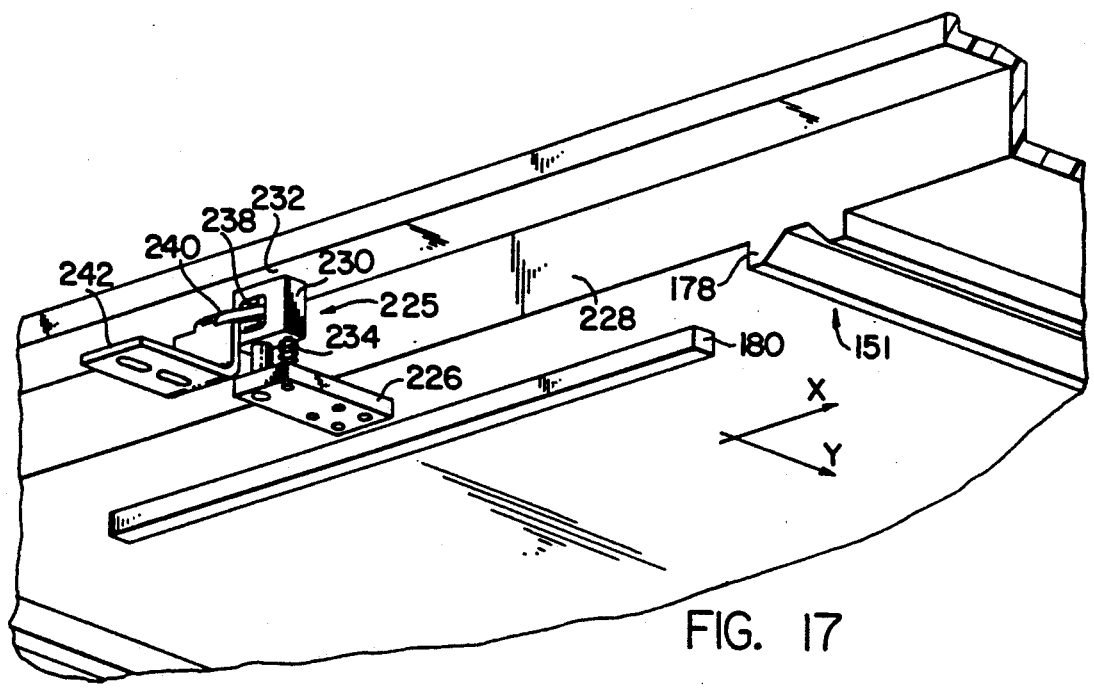
FIG. 17 is a partially fragmentary perspective view of a cassette looking at its side from the bottom.
Figure 18:
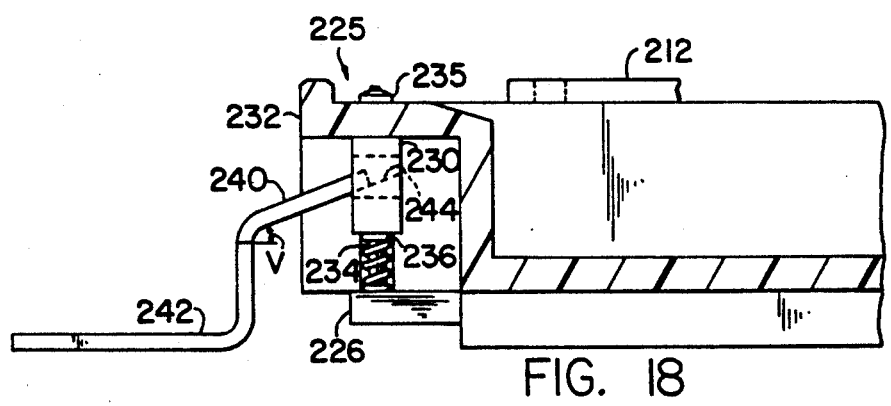
FIG. 18 is a vertical sectional view through a cassette showing in detail the cover automatic release mechanism.
Figure 19:
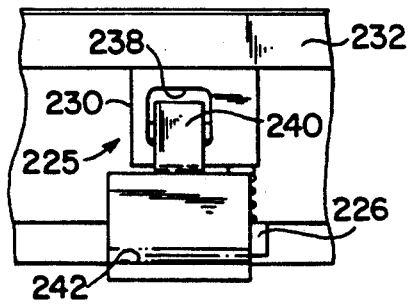
FIG. 19 is a front elevation view of the side of the cassette shown in FIG. 18.

As mentioned previously with reference to FIG. 2A and as now shown more particularly in FIGS. 11 and 13, the support system 28 includes means 130 for removably mounting the loading means 20 to the base 4 of the photoplotter 10. For this purpose, the means 130 includes a support system comprised of a first transverse member 132 releasably fastened to the base 4, and a second transverse member 134 spaced from the first transverse member and interconnected with it by a longitudinally extending connecting rod 136. The channel 31 is fixed to and supported by each of the first and second transverse members 132 and 134 above the platen 12 and the first receptacle means 23. As can be seen from FIG. 12, the connecting rod 136 is held at its elevated position above the platen 12 by a support 138 extending from the base 4 and maintaining each of the transverse members 132,134 substantially horizontally when the rod 136 rests on it.

On the side opposite the connecting rod 136 a cylindrical way 140 is provided for slideably connecting the free ends 142 and 144 of the transversely extending members 132 and 134 with the base 4. Slide bearings 141,141 each having a collar portion which encircles the way 140 in excess of 180 degrees, connect the free ends 142 and 144 of the transverse members to the way allowing them to be both slid and rotated relative to the base 4. The way 140 is secured against movement to the base 4 of the photoplotter at one end 147 and extends away from this point a distance sufficient to allow the leading edge of the channel 41 to be withdrawn from its normal location within the plotter 10 adjacent the datum D. When desired to move the loading means 20 clear of this normal operating position, the first transverse member 132 is disconnected from the base 4 and the channel 31 is slid out from within the plotter along the way 140 until it clears the front face of the base 4 whereupon it is rotated in the indicated direction Z until it stands clear of the mechanism below it.

Figure 3A:
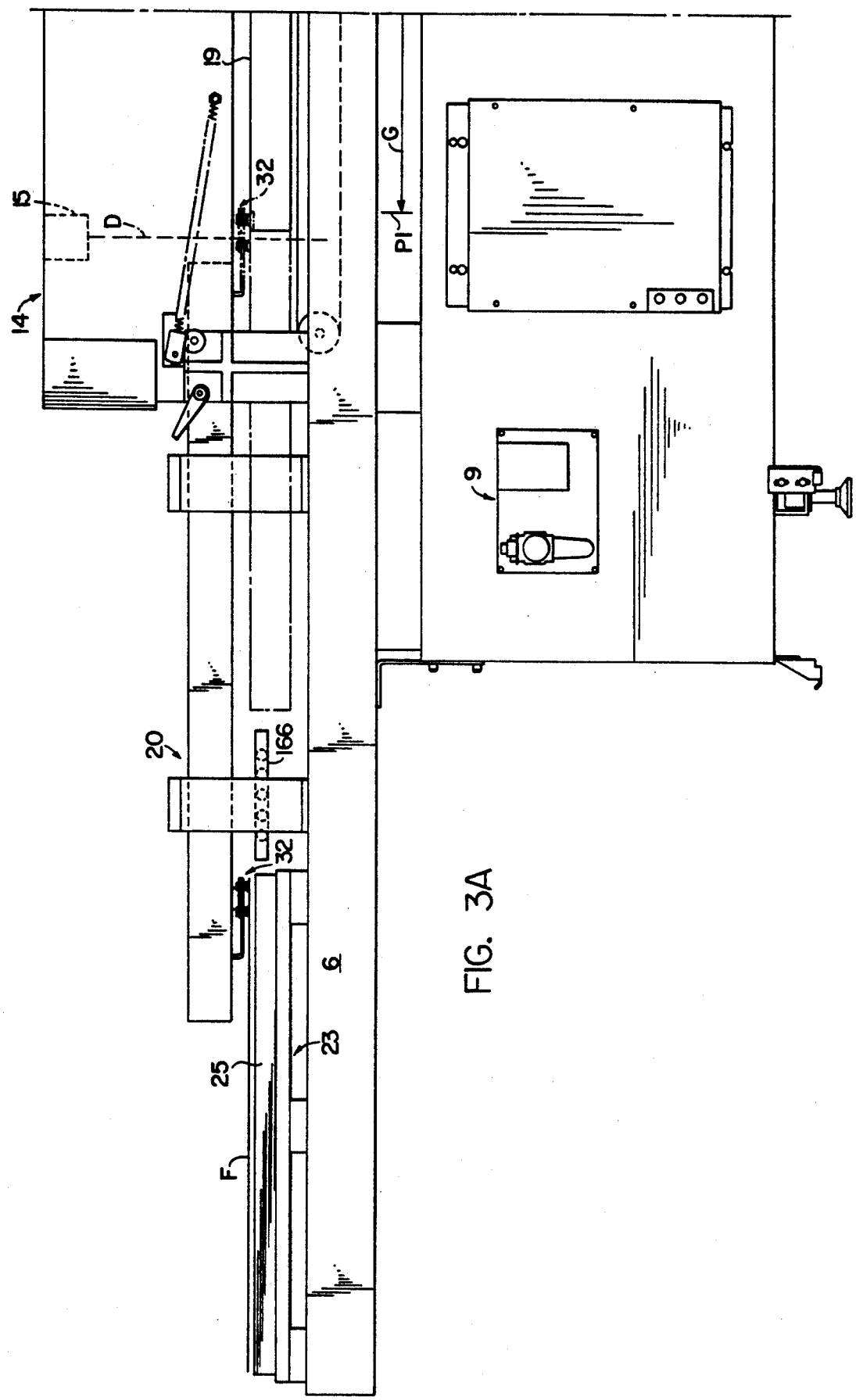
Figure 5:
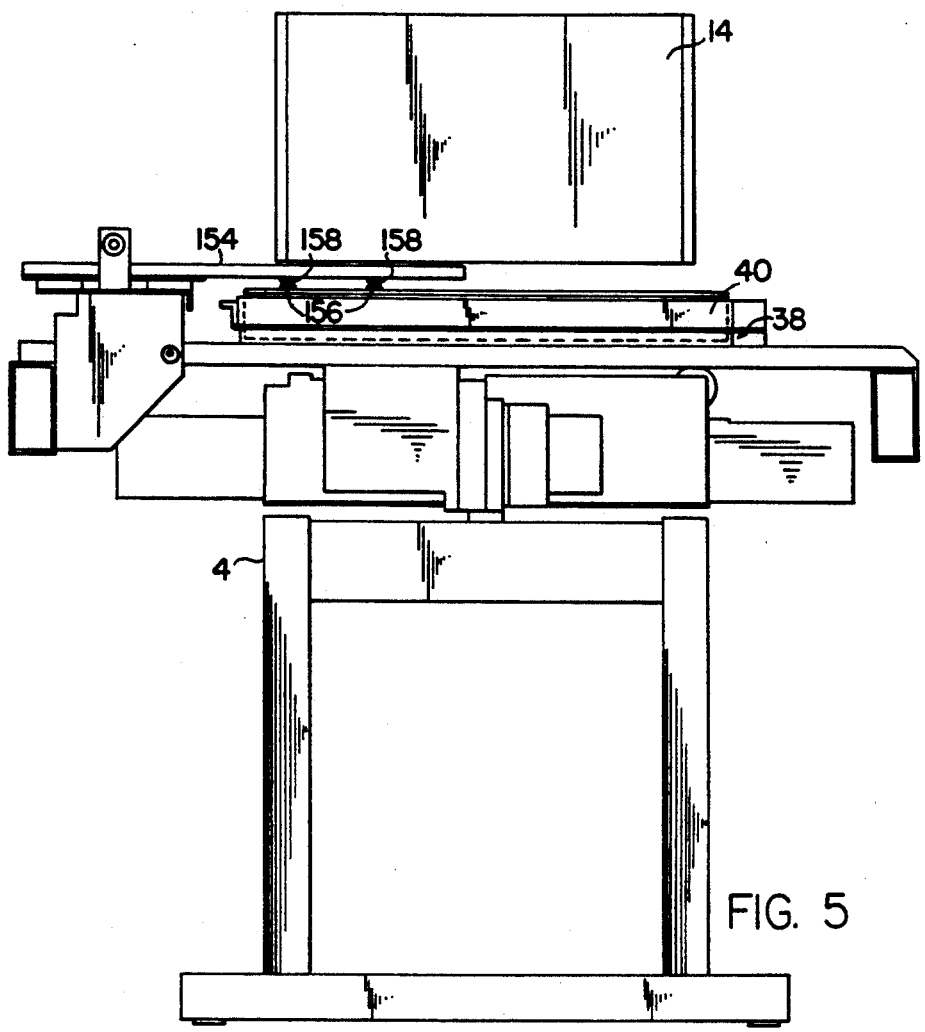
FIG. 5 is an end elevation view of the system shown in FIGS. 3A and 3B looking at it from the right.
Figure 7:
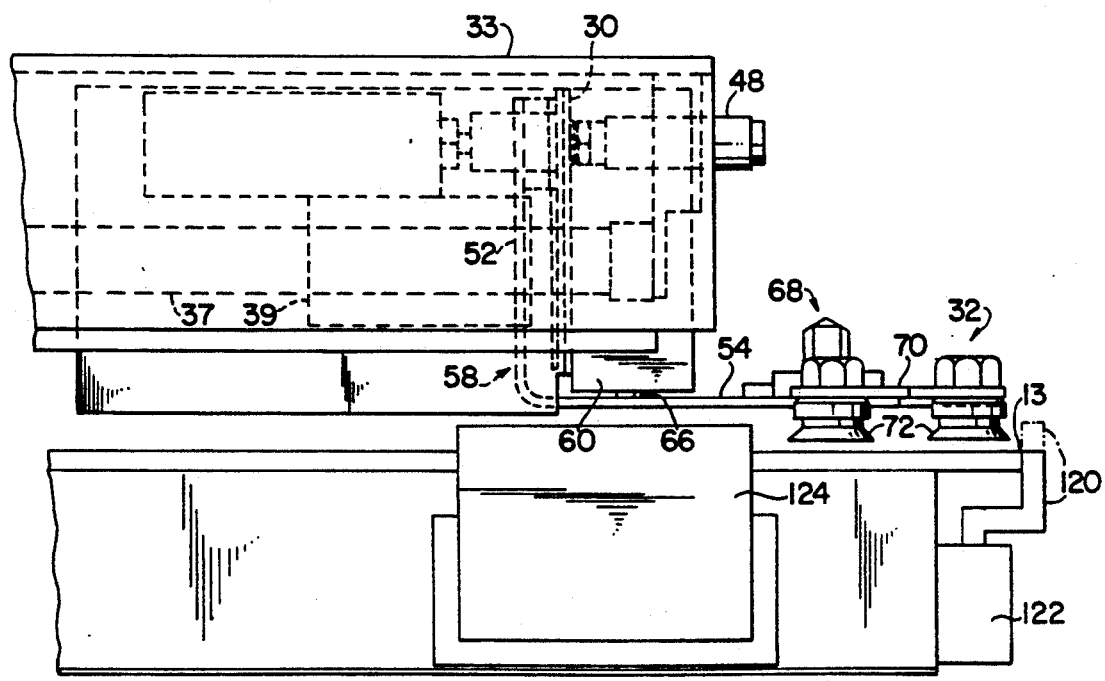
FIG. 7 is a side elevation view showing the platen and the moveable front stop in phantom line at its raised position along with the docking assembly.
Figure 8:
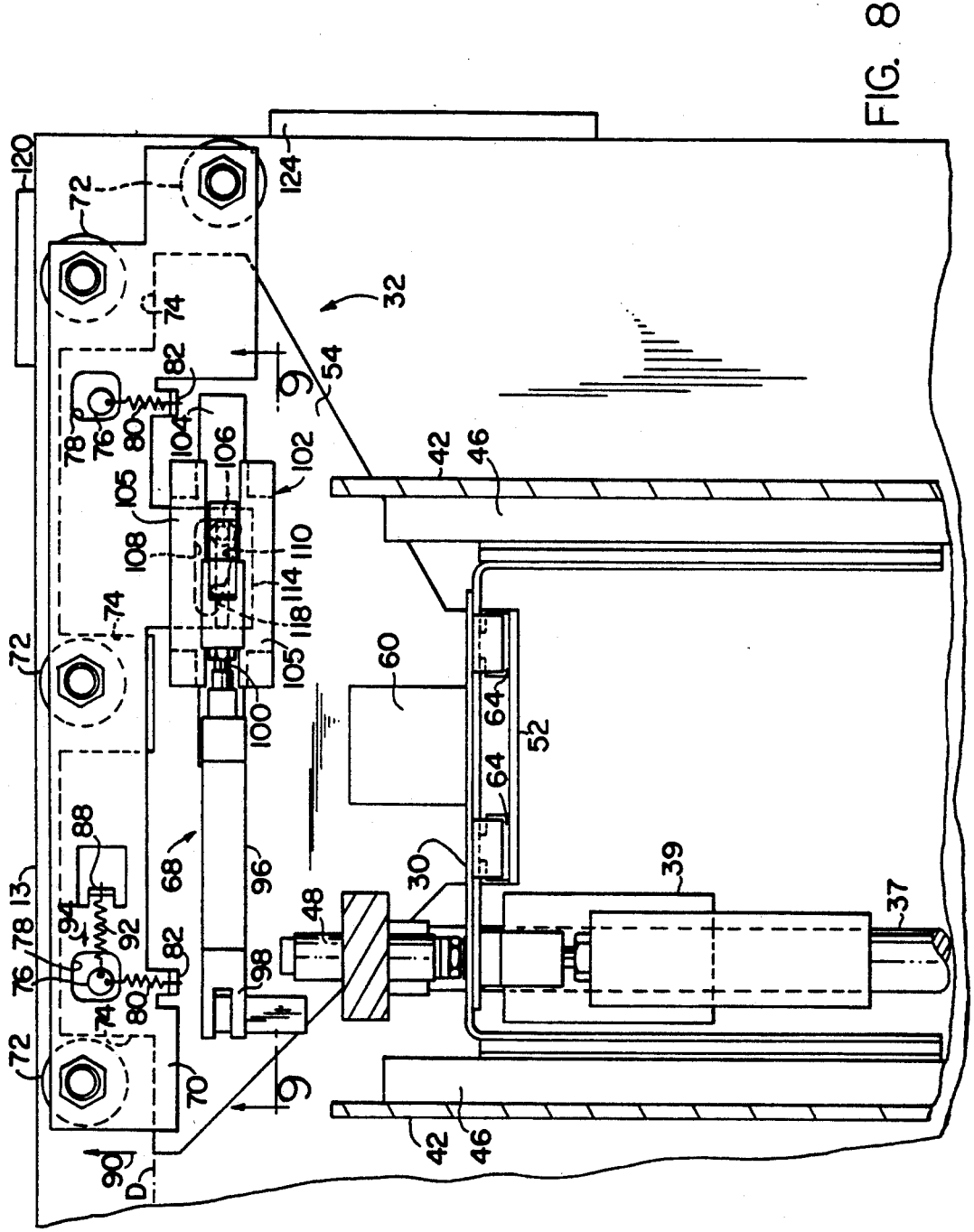
FIG. 8 is a horizontal sectional view taken through the channel along line 8—8 in FIG. 6 and shows the docking assembly in plan view.

The off-loading means 24 as illustrated in FIGS. 2B, 3B and 5 includes a second receptacle means 38 associated with the opening 5 for receiving in locking engagement therewith a collecting cassette 40 into which media sheets are placed after undergoing a work operation on the platen 12. This means further includes a carrying mechanism 146, a way 148 extending in the indicated X coordinate direction between the second receptacle means 38 and the platen 12, a second carriage 150 movable along the way 148 and carrying the mechanism 146 between a first position Q1 at which it is positioned slightly inwardly of the platen leading edge 13 and a second final position Q2 at which it is positioned generally adjacent the distal end of the second receptacle means 38. The second carriage 150 is controllably driven between these limits by a conventional linear drive 160 which in the preferred embodiment, is similar to the drive employed by the loading means 20. It should thus be understood here that the final position P2 which defines the travel limit of the leading edge 13 of the platen 12 is for a short distance coextensive with the travel of the carrying mechanism 146 from its Q1 position such these two travel paths overlap in this region.

The way 148 is disposed laterally of and adjacent to the platen 12 and the receptacle means 38 such that the carrying mechanism 146 is cantilevered outwardly therefrom and over underlying portions of these members. For this purpose, the mechanism 146 is comprised of a transversely extending arm 154 secured at one end to the second carriage 150 and includes a plurality of suction elements 156 secured to the arm 154 at its other end through the intermediary of attachment strips 158 extending generally perpendicularly and outwardly therefrom. The attachment strips 158 are sufficiently stiff to hold the suction elements 156 in a position slightly above the media sheet F supported below it on the platen 12, but are somewhat capable of flexure to allow the suction elements to be drawn downwardly into engagement with the upper surface of the media sheet F in accordance with an aspect of the invention which will hereinafter become apparent. Since the carrying mechanism 146 does not employ a docking assembly as is provided in the loading means 20, no lateral offset exists between the collecting cassette 40 right side wall and the side stop 124 thus allowing a media sheet to be advanced directly into right justified seating with the right corner of the collecting cassette 40.

To aid in moving the media sheets F from the supply cassette 23 and onto the platen 12 and thereafter from the platen 12 and into the collecting casette 40, a first air supporting means 166 is provided between the media supply cassette 23 and the platen 12 while a second air supporting means 168 is provided between the platen 12 and the collecting cassette 40. The first and second air supporting means are connected to the pressurized air source 9 to selectively receive a positive flow of air thereby providing a cushion or bed of air upon which the media sheet is supported during advancement either onto the platen 12 from the supply casette 25 or off of the platen and into the collecting cassette 40. In addition, it should be seen that the platen 12 is not only capable of drawing down the media sheet onto it by vacuum, but is also capable of floating a media sheet above it when airflow to the platen is reversed. The sequencing of positive and negative air pressure to the platen 12 as well when the first and second air supporting means are activated during the operation of the system will be discussed in greater detail later, but for the moment it is only necessary to understand that the system includes these features.

FIGS. 14–16A, 16B and 16C show means 21 for locking a supply or collecting cassette into position respectively within the first and second receptacle means 23 and 38. The means 21 includes a plate 170 either directly supporting or attached below a surface which supports a cassette within each receptacle means and further includes a locking means 182 for positively engaging a cassette to lock it in a preselected position against a locating abutment 181 positioned within each receptacle means. As shown in FIG. 1, the openings 3 and 5 face laterally outwardly of the longitudinal extent of the device such that both the supply and the collecting cassettes must be sidewise loaded and unloaded through these openings. For purposes of locking a cassette when fed into the photoplotter in this manner, each locking means 182 includes a pair of substantially circular wheels 172, 174 oriented lengthwise parallel to the indicate Y coordinate direction and are rotatably connected to one another by a shaft 184 received within journaling means 186,186 located below the plate 170 and extending in a direction parallel to the indicated X coordinate axis. The wheels 172, 174 are mounted such that a portion thereof extends upwardly beyond the surface which supports the involved casette. A means 188 is provided for rotating the shaft 184 about its longitudinal axis in either rotational direction. This means 188 includes an actuator 190 secured against movement at one end to the base 4 and coupled at its other end to the shaft 184 through the intermediary of a crank arm 192. The crank arm 192 is pivotally connected to the actuator 190 by a cleft link 194 secured to the distal end of a moveable rod 196 reciprocally driven by the actuator 190 between an extended and the retracted position shown in FIG. 15.

Receiving means in the form of cut-outs 198,198 are formed in each of the wheels 172 and 174 and are sized appropriately to receive an engaging element 180 carried by the cassette to coengage it with the means 21. As seen in side view, each of the cutouts 198,198 has a generally involute shape as defined by a neck 200 and a base 202 each interconnected with one another by a leading portion 203 and a trailing portion 204 which portions becoming generally wider proceeding from the neck 200 and towards the base 202. The wheels 172 and 174 are oriented on the shaft 184 such that as the shaft is caused to be rotated in either rotational direction by the actuator 190, the cut-outs 198,198 are moved between a generally vertical or 12 o'clock orientation and an angularly displaced position generally coincident with the support surface of the plate 170 as indicated in phantom line in FIG. 14.

In FIGS. 16A–16C the operation of the locking means 21 is illustrated. In the mode shown in FIG. 16A, the wheels 172 and 174 are positioned in an initial or open position. Here, the cutouts 198,198 are located generally at a 2 o'clock orientation, such that the neck 200 is aligned so as to receive the engaging element 180 as the casette is manually slid towards the abutment 181 along coengaging guide means 151 disposed in the Y coordinate direction and interposed between the cassette and the surface on which it is supported. The cassette is eventually restricted in its movement towards the abutment 181 by the confronting trailing connecting portions 204 of each cutout 198,198 now positioned above the plate 170. With this initial engagement, the wheels 172 and 174 are caused to be rotated counterclockwise approximately 45 degrees to position each of the cutouts generally at a topmost position. In so doing, the leading side 178 of the casette is drawn up against the abutment 181 and is held thereagainst by the leading connecting portions 204 of the cutouts 198,198 as is illustrated in FIG. 16B. The casette now is locked against inadvertent removal from the photoplotter 10 thus preventing the media sheets contained within from being unloaded prior to the cassette being covered in accordance with a further aspect of the invention.

In FIG. 16C the third mode of operation for the means 182 is shown. Here, if predetermined conditions are met, the actuator 190 is again energized in order to rotate the wheels 172 and 174 in a clockwise direction, such that the previously engaging leading connecting portion 203 of the cutouts 198,198 is moved out of engagement with the element 181 and after some rotational lost motion, the trailing connecting portions 204 are caused to engage with the element 181 and move the casette along the plate 170 in the direction shown by the arrow until the cutouts 198,198 are again orientated in the open position shown in FIG. 16A thereby allowing the element 181 to pas freely through the neck 200 of the cutouts.

It is a feature of this system to prevent inadvertent exposure of the photosensitive medium to daylight or artificial light while contained in a cassette. For this purpose, as illustrated in FIGS. 17-20, each of the supply and collecting cassettes 25 and 40 is provided with a light tight cover 212 slidably received sideways thereover so as to make the cassette impervious to light. A locking means 225 is provided on each cassette and maintains the cover 212 in a closed condition when the cassette and the media contained in it are disposed outside the photoplotter. For insuring that a cover is disposed on a casette before the unlocking sequence discussed with reference FIG. 16C above is effected, each first and second receptacle means is provided with a sensor 210 capable of detecting a cover disposed on each cassette.

Provided within each of the first and second receptacle means 23 and 38 is a means 224 for automatically releasing the cover 212 from a locked condition on its associated casette. The means 224 includes an extension member 226 extending from the underside of the casette outwardly beyond the casette leading sidewall 228 and supports a trip block 230 for movement vertically along a guide 234 extending upwardly from it. A pin 235 extends from the trip block 230 upwardly through and beyond a correspondingly sized opening formed in the horizontal portion 232 of the casette thereby providing a detent engagable with the cover 212 to lock it closed. The trip block 230 is normally biased upwards against the lower surface of the horizontal portion 232 by a biasing means 236 interposed between it and the member 226 thereby normally maintaining the top portion of the pin 232 in its blocking position.

To effect movement of the pin 232 out of its blocking position, a generally box-like through opening 238 is formed in the trip block 230 having a sufficient size along its width dimension to a receive an elongate flange 240 extending angularly upwardly from a mounting portion 242 at an angle V taken relative to a horizontal plane. Formed within the opening 238 is a camming surface 244 complementarily configured to correspond to the angle V of the flange 240 such that upon the continued forward motion of the locking means 21, the cam surface 244 is caused to be driven downwardly by its engagement with the flange 240 in turn pulling the top portion of the pin 234 below the upper surface of the horizontal portion 232 of the casette and allowing the cover 212 to be slid off.

Figure 20:
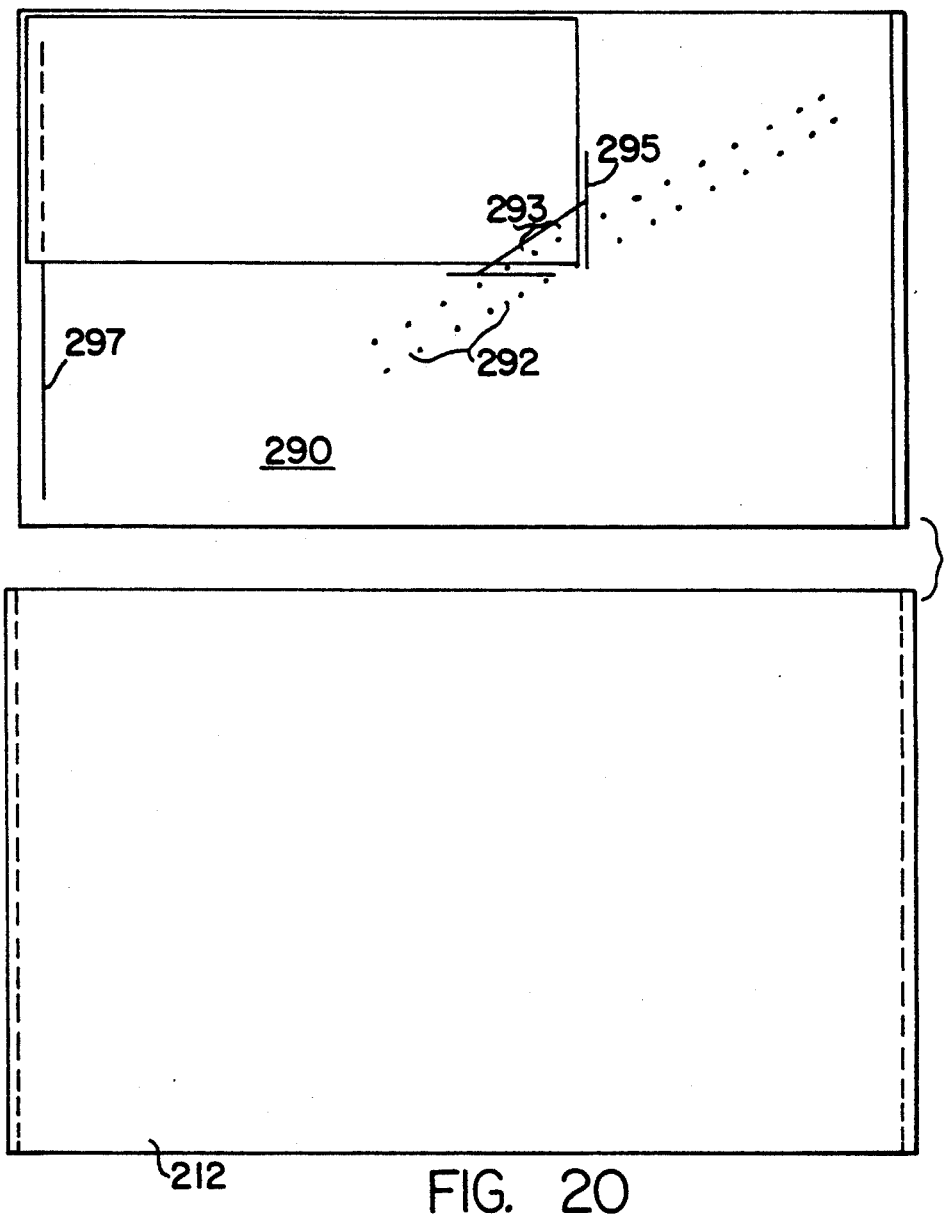
FIG. 20 shows in plan view a cassette with its cover slid off revealing the orientation means for maintaining alignment of the media sheets therein.

As shown in FIG. 20, each supply casette 25 and collecting casette 40 is capable of holding a variety of sized media sheets up to a given maximum dimension equal to generally to that of the casette interior confines. To this end, each casette is provided with an angle member 295 having two upstanding orthogonally oriented side walls capable of confronting the corresponding edges of the media sheets at the lower left corner thereof. The base 290 of each casette has a series of spaced openings 292 arranged in a pattern such that a given opening pair is capable of receiving a pair of pins 293, 293 depending from the angle member 295 for maintaining each media sheet in a right justified arrangement regardless of size variations.

Referring now to FIG. 21, a means 250 may be included as part of the handling system for discarding paper sheets which may be interposed between media sheets as part of a prepackaged supply cassette. Such paper is often found between media sheets which employ an aluminum substrate allowing the media to be stacked one upon the other within the supply casette so as to avoid scratching the photosensitive films which otherwise would contact with the metal substrate. The means 250 includes an endless drive 252 mounted for both horizontal and vertical movement relative to the supply casette 25 located adjacent thereto on a plate 254 capable of being pivotally articulated through a plurality of movements by an actuator linkage means 258.

The endless drive 252 includes a drive motor 260 drivingly connected to a first roller means 262 and has a second roller means 264 spaced laterally from the first roller means drivingly coupled to it by an endless belt 266. The endless belt 266 further travels along a loop which includes a third roller means 268 rotatably mounted to a laterally extending portion of the plate 254 such that the belt travels around the third roller means and in between the first and second roller means and then around the first roller means and returns back to the third roller means to complete the loop. The endless belt 266 has a rather high frictional surface and moves clockwise about the loop such that it is brought into engagement with a paper sheet lying exposed on the media stacked below it such that when engaged by the belt, it is drawn with it along a path between the first and second roller means and subsequently discarded downwardly where it collects as waste.

The plate 254 is pivotally connected at a first pivot point 270 to a support arm 272 which is in turn pivotally connected to the base 4 at a second pivot point 274 remotely of the first. The endless drive 252 must be capable of being manipulated both vertically and horizontally so as to be moved between a gap existing between the supply casette 25 and the base 4 of the photoplotter. For this purpose, the actuator linkage 258 includes a vertical actuator means 276 connected between the base 4 and the support arm 272 and a pair of horizontal actuators means 278 and 280 arranged in tandem between the base and the plate 254 each of which actuators being responsible for the sequenced vertical and horizontal movements of the endless drive through this gap. It being noted that the second air supporting means 168 is shown in phantom line because it is likewise movable to allow the endless drive 252 to be positioned in its place.

Figure 22A:
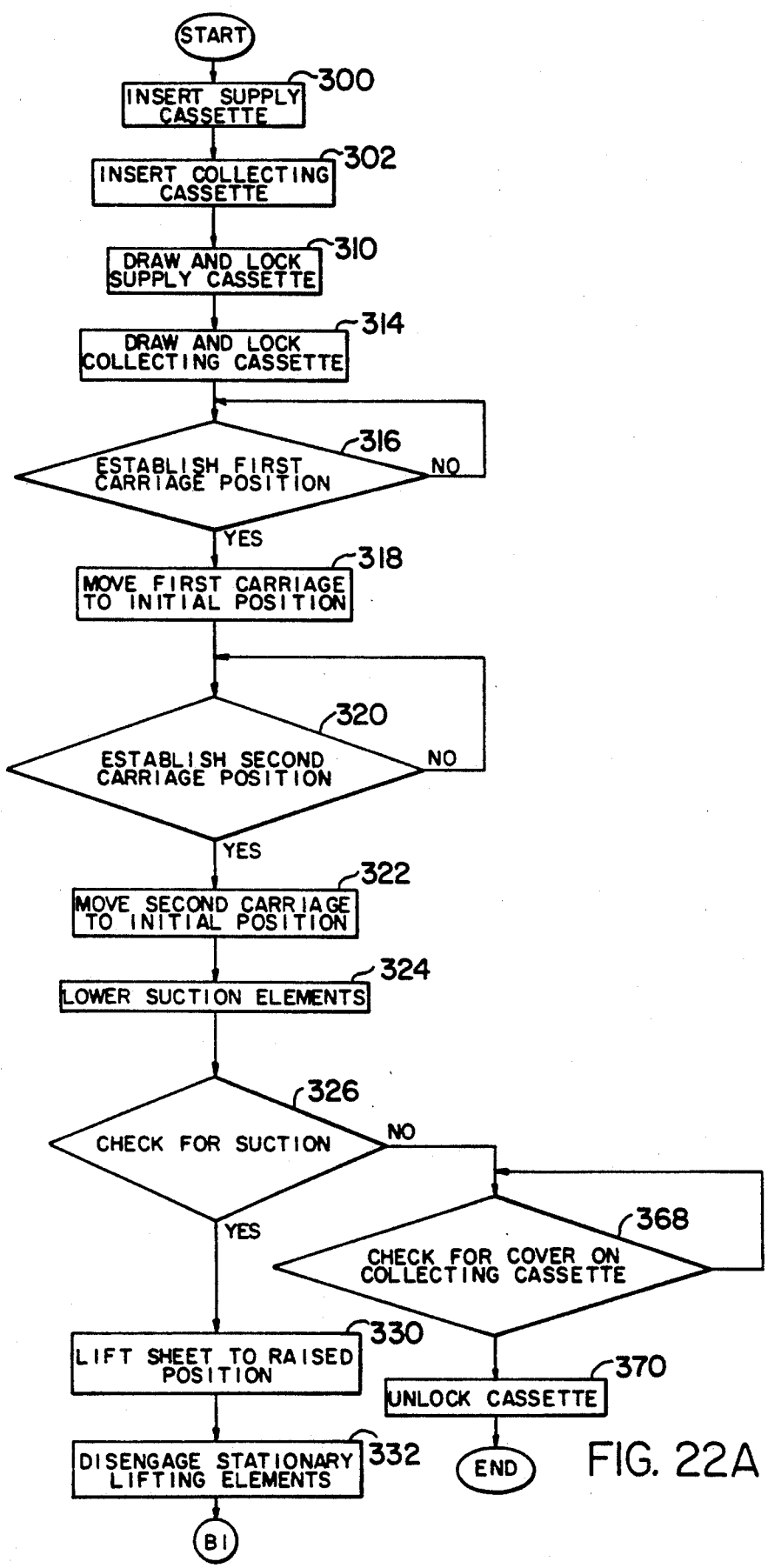
FIGS. 22A-22C illustrate a flowchart of the operation of the handling system.
Figure 22B:
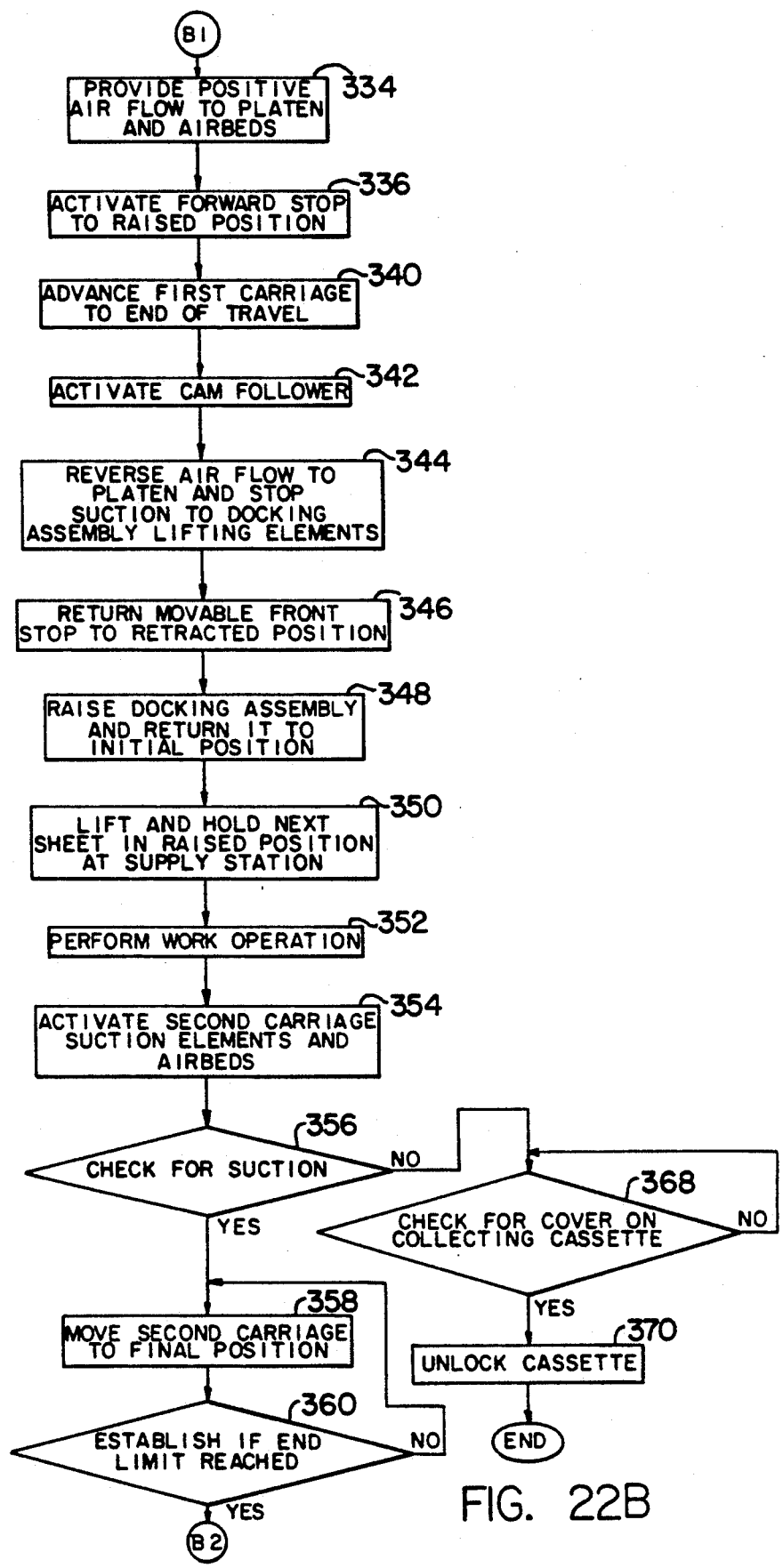
Figure 22C:
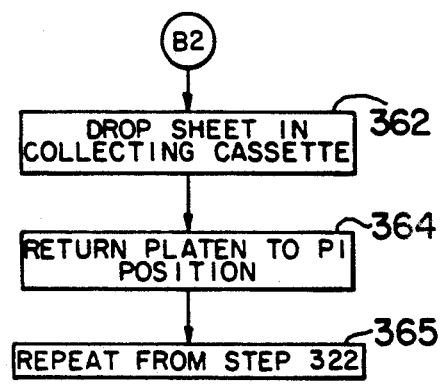

FIGS. 22A-22C show the operation of the media handling system generally in flowchart form. The operation starts with the platen 12 being moved to its P1 position and an operator inserting a covered supply casette 25 containing the unexposed media sheets and an empty collecting casette 40 each respectively into each of the associated receiving openings 3 and 5 (steps 300 and 302). The locking means 21 associated with each of the first and second receptacle means 23 and 38, is then caused to be energized (steps 310 and 314) thereby locking the involved cassette in accordance with the procedure set forth with reference to FIGS. 16A-C. The cover 212 of the supply cassette 25 consequently is automatically unlocked in this process thus allowing it to be pulled off while the cassette remains locked in place within the first receptacle means 23. The positions of the first carriage 30 and that of the second carriage 150 are next determined by interrogating limit switches which are disposed respectively at the ends of the ways of 46 and 148 (steps 316 and 320). If it is determined that the first carriage 30 is not at its S1 limit adjacent the supply casette, then it is moved to this position (step 318) and likewise if the position of the second carriage 150 is determined to be other than at a its Q1 position, it is subsequently caused to be moved to it (step 322).

The system next begins to handle the media by causing simultaneous downward movement of the suction elements carried by the lifting members 34 and the docking assembly 32 such that the suction elements included in each of these members engage the upper surface of the topmost media sheet (step 324). Here, it is important to note that the suction elements 36 and 72 are connected to a vacuum supply source such that if a vacuum is not sensed within a given interval, i.e. about 3 seconds, by a sensor position in line between the elements and the source, the controller 16 interprets this condition as one indicating that the supply cassette is empty (step 326). As shown in FIG. 20, one way of effecting this is to employ a laterally extending groove 297 formed in the base 290 of the cassette along a line coincident with the downward travel path of the suction elements. When the suction elements are brought into engagement with the base 290, the groove 297 prohibits the sealing engagement of the suction elements on this surfaces, thereby causing the vacuum sensors in the system to exit the sequence at step 326.

Assuming a vacuum seal is made, the suction elements of the lifting members 34 and docking assembly 32 are then caused to be moved to their uppermost position thereby lifting the front edge of the media sheet above the work surface 19 (step 330). Subsequently, vacuum is stopped to the suction elements 36 of the lifting members 34 such that the media sheet F is held solely by the docking assembly 32 along its rightmost front leading edge (step 332). At this point, pressurized air is introduced to each of the airbeds 166,168 and to the platen 12 to provide an air cushion upon which the media sheet F will be supported as it is moved toward its final docked position (step 334). The moveable front stop 120 located along the table leading edge 13 is then actuated to move it above the work surface 19 (step 336). With the media sheet in tow behind it, the first carriage 30 is then moved from its S1 position to the S2 position adjacent the platen leading edge 13 (step 340). Once the first carriage 30 arrives at the S2 limit the actuator 60 of the cam follower means 102 is energized (step 342) thus effecting final two axis motion that precisely orients the media along these axes in a manner discussed previously with reference to FIGS. 6–10.

With the media sheet F maintained in registry with both the front stop 120 and the corresponding side stop 124 on the platen 12, the air flow to the platen 12 is then reversed and the vacuum to the suction elements 72,72 is simultaneously stopped (step 344) with the result being that the media sheet F is held in precise right justified registration on the platen 12. The moveable front stop is returned to its resting position (step 346) and the slide plate 70 is moved to its upper limit of travel and thereafter the first carriage 30 is caused to move from the S2 back to its initial S1 position thereby freeing the datum D of obstruction by the assembly (step 348). After the docking assembly 32 returns to the S1 position, the next media sheet is lifted to a position above the platen 12 in the manner discussed with reference to step 324 and is held there by the docking assembly 32 until an initiate signal is given to reexecute the steps 336–344.

The work operation is next performed on the media sheet F such that by moving the platen 12 between the P1 and P2 positions in coordination with the tracking system of the laser module 15, each raster of the graphic becomes exposed on the photosensitive surface of the media F (step 352). After this operation is complete and the platen leading edge 13 is moved to its final P2 position, the airflow to the platen 12 is again reversed introducing positively pressurized air to the platen 12 while simultaneously introducing vacuum to the suction elements 156,156 carried by the off-loading means 24 (step 354). At this point, positive air flow is also provided to the first and second air support means 166 and 168. In a manner similar to that discussed with reference to step 326 above, sensors are also provided in line between the vacuum source and the suction elements 156,156 connected to it to indicate the presence of a vacuum when sealing engagement between the media and these elements occurs (step 356). It is noted here that the suction elements 156 are supported above the work surface 19 in a very close proximity to it at approximately ¼ inch, and that the combined effects of the underlying air cushion from the platen 12 and the draw created by the elements 156,156 serve to readily couple the media sheet with the elements 156,156. Alternatively, the suction elements 156,156 can be mechanically lowered into engagement with the media sheet F.

The second carriage 150 is next caused to be moved along the way 148 from its present Q1 position to its final limit at the Q2 position whereupon when the limit switch associated with the Q2 position is activated and indicates that the media sheet F is in position for placement into the collecting casette 40 (step 360), the vacuum source provided to the suction elements 156,156 is stopped allowing the media sheet to drop into the collecting casette 40 (step 362).

At this point, the platen 12 is then returned to its initial P1 position (step 364) to again receive the next media sheet presently being held by the docking mechanism 32 for advancement onto the platen 12 as discussed with reference to step 350. This sequence is generally repeated from step from step 322 and cycles until the suction elements 36,36 and 72,72 associated with the loading means 20 are caused to engage the groove 220 formed in the base 290 of the supply casette thereby indicating that the supply of media in the cassette 25 has been depleted.

The system now initiates the sequence for releasing the collecting cassette from it receptacle means 38. Here the sensor 210 associated with the second receptacle means 38 is interrogated to determine whether the operator has a slid cover 212 over the collecting casette 40 (step 368). With the cover now determined to be in place on the collecting casette 40, the locking means 21 is again energized thus rotating the wheels 174 and 176 to release the covered collecting cassette 40 (step 270) outwardly from its receptacle in accordance with the aspect of the invention discussed previously with reference to FIG. 16C.

From the foregoing, a media handling system is disclosed in which media sheets are handled in a light-tight environment from a supply source through a photoplotter where a work operation is conducted on the media sheet and subsequently advanced to a location where the sheets collect. However, numerous modifications and substitutions may be had without departing from the spirit of the invention. In particular, while the radiant energy means disclosed in the present application has been specified as a laser raster scanner, it is entirely within the scope of the present invention utilize this system in a vector type plotter which exposes a desired graphic on the underlying workpiece. Also, it should be understood that in describing the registry of the media with reference to it orientation on the platen 12, the terms right justified and leading edge wise as applied to the positions assumed by the media on the work surface 19 have been used for clarity purposes and that these terms should be taken in a relative sense only and are not intended to limit the scope of the invention. Additionally, the openings 3 and 5 formed in the photoplotter cover while disclosed in the preferred embodiment as facing laterally of the length of the machine, may in other forms of the system, face in a direction parallel to the length of the machine.

Accordingly, the invention has been described by way of illustration rather than limitation.

We claim:

1. An article handling system for use in a photoplotter for moving an article along a path of travel from an initial position corresponding to the location of a supply of such articles to a final position corresponding to a location where articles are collected, said system comprising:

a base;

a support surface supported by said base:

said support surface having registration means associated with it for orienting one of said plurality of articles in registration with two orthogonally oriented axes;

loading means associated with one side of said support surface and including means for pulling an article from a supply of such articles located at an initial position and including means supported for movement above said support surface for automatically advancing the one of the plurality of articles onto said support surface from the initial position located generally adjacent said one side of said surface and for advancing the involved one of said plurality of articles onto said support surface so as to position it thereon in a preselected orientation in registration with said two orthogonally oriented axes;

off-loading means associated with the other side of said support surface and with the location where articles are collected for advancing said one of said plurality of articles from the support surface and to a final position located on the other side of the of the support surface;

said automatic advancing means including means for yieldably holding the one of said plurality of articles to said loading means and for cooperating with said registration means associated with said support surface such that one of said plurality of articles being handled by said advancing means becomes automatically aligned in a given orientation relative to each of said two orthogonally disposed axes as the loading means advances one of said plurality of articles onto the support surface and into engagement with said registration means from the initial position located generally adjacent said one side of said support surface; and control means for coordinating the movements of said loading means and said off-loading means relative to one another to successively advance articles onto and off said support surface and for automatically effecting registration of an article being advanced in said given orientation on said support surface.

2. A system as defined in claim 1 further characterized in that said support surface is moveable relative to said base between a first position and a second position located between said initial and said final positions; and wherein said first position is located on the one side of said support surface and said second position is located on the other side of the support surface.

3. A system as defined in claim 2 further characterized in that said means for automatically advancing said one of said plurality of articles onto said support surface in a preselected orientation includes means for yieldably moving the involved article in directions parallel to each of said two coordinate axes.

4. A system as defined in claim 3 further characterized by a first receptacle means being located generally adjacent said first position for providing a means for containing said plurality of articles to be advanced through the system; and a second receptacle means being generally adjacent said second location for providing means for collecting said plurality of articles after being advanced from the support surface.

5. A system as defined in claim 4 further characterized in that said loading means includes a first carriage and a docking assembly carried by it and moveable in a direction along one of said orthogonally oriented axes;

said support surface being further defined by a leading edge facing said second receptacle means; and wherein the range of travel of said first carriage extends from a position over said first receptacle means to a position generally adjacent the leading edge of said support surface when said work surface is at its first position.

6. A system as defined in claim 5 further characterized in that said off-loading means includes a second carriage moveable along said one of said two orthogonally oriented axes for advancing an article from the support surface and into said second receptacle means;

said second carriage having a range of travel extending generally from adjacent the leading edge of said support surface when said support surface is moved to its second position, to a position located generally adjacent the end of said second receptacle means disposed remotely of said table.

7. A system as defined in claim 6 further characterized by said loading means including a support system for holding it above said first receptacle means and said support surface;

said loading means further including a plurality of lifting members secured to said support system and arranged along the leading edge of said first receptacle means;

said lifting members each being comprised of a body portion connected to said support system and a moveable suction element capable of being moved downwardly into engagement with an article oriented below it from a normally raised position located adjacent the support.

8. A system as defined in claim 7 further characterized in that said support surface comprises part of a platen moveable between said first and second positions along said one of said two orthogonally disposed axes;
said support surface further including a plurality of pin holes formed in it and extending generally about the area presented by said support surface; and
wherein said system further includes an air moving means connected to said platen for moving air in either direction through said plurality of pin holes formed in said support surface.

9. A system as defined in claim 8 further characterized in that said suction elements are connected to said air moving means such that air being drawn through each suction elements creates a vacuum and causes said elements to sealingly engage with the article positioned below it.

10. A system as defined in claim 9 further characterized in that said first carriage travels along a way extending generally parallel to said one of said two orthogonal axes;
said way being disposed within an inverted generally U-shaped channel carried by said support system.

11. A system as defined in claim 10 further characterized in that said docking assembly depends from said first carriage;
said docking assembly being comprised of a generally L-shaped member moveable relative to the remaining portion of said first carriage between a raised and lowered position.

12. A system as defined in claim 11 further characterized in that said generally L-shaped member is defined by and a vertical portion and a horizontal portion connected to one another at a right angle;
said vertical portion having means cooperating with correspondingly shaped means formed on said first carriage for constraining said L-shaped member against lateral movement as it moves between its upper and lowermost positions.

13. A system as defined in claim 12 further characterized in that said docking assembly further includes a locating means;
said locating means being associated with the horizontal portion of said generally L-shaped member.

14. A system as defined in claim 13 further characterized in that said locating means includes a slide plate supported for movement on and above said horizontal portion of said L-shaped member;
said slide plate carrying a plurality of suction elements depending from it and extending below said horizontal portion of said L-shaped member; and
wherein said slide plate is connected to said generally L-shaped member through the intermediary of a follower means.

15. A system as defined in claim 14 further characterized in that said support surface is generally rectangular and is oriented lengthwise along said one of said two generally orthogonally oriented axes;
said platen including a side abutment wall positioned generally adjacent the leading edge of said support surface; and
wherein said platen further includes a moveable stop located along said support surface leading edge and providing an abutment surface extending generally parallel to the other of said two orthogonally oriented axes such that when taken a from the first receptacle means the moveable stop and the side wall are located at the right corner of the platen thereby right justifying the article advanced onto the work piece support surface by the loading means.

16. A system as defined in claim 15 further characterized in that said horizontal portion of said L-shaped member has a plurality of pin members extending upwardly therefrom;
said slide plate includes plurality of generally square openings formed therein located in said slide plate so as to be oriented generally coincidentally with a corresponding one of said plurality of pins;
each of said pins extending upwardly through and beyond an associated one of said plurality of generally square openings to provide a retaining portion thereon; and
wherein the retaining portion of each of said pins being connected to said slide plate through the intermediary of a tension spring.

17. A system as defined in claim 16 further characterized in that said follower means further includes a horizontally disposed actuator connected at one end to the horizontal portion of the L-shaped member and at its other end two a depending pin slideably engaging within a slot formed in and along said horizontal portion of said L-shaped member;
said slot being disposed generally parallel to the other of said two orthogonally oriented axes; and
wherein said slide plate includes a generally triangularly shaped opening having a cam surface forming one side of the triangular shape and receiving said depending pin therein for coaction therewith.

18. A system as defined in claim 17 further characterized in that at least one of said plurality of pins extending upwardly from said horizontal portion of said L-shaped member is connected to said slide plate by two tension springs each oriented in coincidence with said orthogonally oriented axes such that when the horizontal actuator is in its retracted position, the pin is caused to be cammed against said cam surface of the triangularly shaped opening formed in the slide plate thereby causing the slide plate to be maintained in a retracted condition and when the actuator is extended the depending pin it is caused to be somewhat released from this camming relationship thereby allowing the slide plate to be extended along each coordinate axis.

19. A system as defined in claim 6 further characterized in that said second carriage is driven along a way extending parallel to said one of said two orthogonally disposed axes;
said second carriage having an arm member cantilevered from it and extending in the direction of said other of said two orthogonally oriented axes; and
wherein said arm member carries a plurality of suction elements depending from it.

20. A system as defined in claim 19 further characterized in that said arm member being disposed above said support surface such that when said arm member is positioned adjacent said support surface, the suction elements carried by it are located generally adjacent the leading edge of said support surface; and
wherein each of said suction elements is supported above said support surface from said cantilevered arm by an associated attachment strip, each said attachment strip being capable of flexing downwardly to allow the associated suction element carried by it to be brought into engagement with an underlying article.

21. A system as defined in claim 6 further characterized in that each of said first and said second carriages are driven along an associated way by a separate drive means moveably coupled to each carriage.

22. A system as defined in claim 6 further characterized in that the leading edge of said support surface when positioned at said second position being generally coincident with a datum extending generally along the other of said two orthogonally disposed coordinate axes;

said datum being aligned with a line along which a light beam is projected.

23. A system as defined in claim 22 further characterized in that said support surface presents a given area for supporting an article in sheet form thereon;

said datum being located on said surface proximate said leading edge of said support surface yet is spaced from it by a first given margin; and wherein said given area is further limited by two side margins extending generally parallel to one another and extending generally orthogonally to the datum to a defined net work area on said workpiece support surface along which said beam path is projected.

24. A system as defined in claim 23 further characterized in that each article sheet is handled along portions corresponding to the position of the first given margin and one of said two side margins as delimited on said workpiece support surface.

25. A system as defined in claim 4 further characterized in that said system includes a covering means for light-tight covering of the system while an article is being advanced through it; and wherein said covering has a first opening corresponding generally to the position of said first receptacle means and a second opening corresponding generally to the position of said second receptacle means.

26. A system as defined in claim 25 further characterized in that said first receptacle means includes a supply casette in which is contained said plurality of articles in sheet form;

said supply casette being correspondingly sized to be received within said first opening formed in said cover and said first receptacle means having means for locking said supply casette in engagement with it;

the first opening formed in said cover further includes a light tight seal engaging with the supply casette when it is inserted into said first receptacle means, and wherein the supply casette includes an angle member for maintaining a desired orientation of the articles when contained therein.

27. A system as defined in claim 26 further characterized in that said first receptacle means includes a stationary surface for supporting the supply casette thereon and a locking means associated therewith;

said locking means including two wheels spaced apart and drivingly connected with one another below the stationary surface such that a portion of each wheel extends upwardly beyond it;

each of said wheels having an involute cutout formed in it and moveable between a generally vertical orientation and one generally coincident with the mounting surface; and wherein the supply casette includes an engagement means cooperating with each of said involute shapes for selectively locking the cassette in said first receptacle means.

28. A system as defined in claim 27 further characterized in that said supply casette includes a cover member slidably disposed over it for maintaining a light-tight seal therebetween; and wherein said first receptacle means includes a sensor for detecting the presence of said cover on said casette when the casette is in said first receptacle means.

29. A system as defined in claim 25 further characterized in that said second receptacle means includes a collecting casette containing said plurality of articles in sheet form after a work operation has been conducted on them;

said collecting casette being correspondingly sized to be received within said second opening formed in said cover and said second receptacle means having means for locking said collecting casette in engagement with it;

the second opening formed in said cover further includes a light tight seal engaging with the supply casette when it is inserted into said second receptacle means; and wherein the collecting cassette includes an angle member for maintaining a desired orientation of the articles when contained therein.

30. A system as defined in claim 29 further characterized in that said second receptacle means includes a stationary surface for supporting the supply cassette thereon and a locking means associated therewith;

said locking means including two wheels spaced apart and drivingly connected with one another below the stationary surface such that a portion of each wheel extends upwardly beyond it;

each of said wheels having an involute cutout formed in it and moveable between a generally vertical orientation and one generally coincident with the stationary surface; and wherein the collecting cassette includes an engagement means cooperating with each of said involute shapes for selectively locking the cassette in said second receptacle means.

31. A system as defined in claim 30 further characterized in that said collecting cassette includes a cover member slidably disposed over it for maintaining a light-tight seal therebetween; and wherein said second receptacle means includes a sensor for detecting the presence of said cover on said casette when the casette is in said first receptacle means.

32. A system as defined in claim 28 further characterized in that said locking means cooperates with means for automatically releasing the cover menber from the involved cassette.

33. A system as defined in claim 1 further characterized by a first receptacle means associated the one side of said support surface, said first receptacle means including a casette containing a plurality of article sheets therein;

said casette being of the type wherein between each of said article sheet is disposed a paper sheet separating one article sheet from the another;

said first receptacle means further including a means for discarding each paper sheet from said supply casette as it becomes exposed prior to advancing the article sheet disposed below it.

34. In a photoplotter of the type which creates graphic information on photosensitive media in sheet form, a system for handling such media, including advancing the media through the photoplotter along a path of travel from an initial position corresponding to a location of a supply of such media to a final position corresponding to a location where the media is collected, said system comprising;

a base;

a first means for providing a supply in the form of a plurality of media sheets to be moved through the photoplotter;

a platen having a support surface supported by said base and being sufficiently sized to support a media sheet placed upon it, said support surface having registration means associated with it for orienting a media sheet in registration with two orthogonally oriented axes;

a second means for collecting said media sheets after being advanced off said platen;

loading means associated with one side of said support surface including means for pulling a media sheet from a supply of such media sheets and including means supported for movement above and between said first means and said support surface for advancing a media sheet from said first means and onto said support surface;

said loading means further including locating means for automatically positioning the involved media sheet on said support surface in precise registration with a given orientation in registration with said two orthogonally oriented axes;

off-loading means associated with the location where articles are collected and supported for movement between said support surface and second means for carrying the involved media sheet off the support surface of the platen and into said second means;

said locating means yieldably holding one of said plurality of media sheets to said loading means and for cooperating with said registration means associated with said support surface such that one of said plurality of media sheets automatically becomes aligned in said given orientation with respect to each of said two orthogonally disposed axes as the loading means advances the one of said plurality of media sheets being handled by said loading means onto the support surface and into engagement with said registration means from the position located generally adjacent said one side of said support surface; and control means for coordinating the movements of said loading means and said off-loading means to effect advancement of a media sheet from the first means onto said support surface in precise registration with said given orientation and for causing said off-loading means to advance the involved media sheet off the support surface and into said second means.

35. The combination as set forth in claim 34 further characterized in that said support surface is moveable relative to said base between a first location and a second location; and wherein said first location is associated with one side of said support surface and said second location is associated with the other side of the support surface.

36. The combination as set forth in claim 35 further characterized by said first means being associated generally adjacent said first location for providing a means for containing said plurality of media sheets to be advanced through the system; and by a said second means being associated generally adjacent said second location for providing means for collecting said plurality of articles after being advanced from the support surface.

37. The combination as set forth in claim 36 further characterized in that said loading means includes a first carriage and a docking assembly carried by it and moveable in a direction along one of said orthogonally oriented axes;

said support surface being further defined by leading edge facing said second means; and wherein the range of travel of said first carriage extends from a position over said first means to a position generally adjacent the leading edge of said support surface when said work surface is moved to the first location.

38. The combination as set forth in claim 37 further characterized in that said off-loading means includes a second carriage moveable along said one of said two orthogonally oriented axes for advancing an article from the support surface and into said second means;

said second carriage having a range of travel extending generally from adjacent the leading edge of said support surface when said support surface is moved to its second location, to a position located generally adjacent the end of said second means disposed remotely of said table.

39. The combination as set forth in claim 34 further characterized in that said loading means includes a support system for holding it above said first means and said support surface;

said loading means further including a plurality of lifting members secured to said support system and arranged along the leading edge of said first means;

said lifting members each being comprised of a body portion connected to said support system and a moveable suction element capable of being moved downwardly into engagement with a media sheet oriented below it from a normally raised position located adjacent the support.

40. The combination as set forth in claim 35 further characterized in that said support surface comprises part of a platen moveable between said first and second locations along said one of said two orthogonally orientated axes;

said support surface further including a plurality of pin holes formed in it in extending generally about the area presented by said support surface; and wherein said system further includes an air moving means connected to said platen for moving air in either direction through said plurality of pin holes formed in said support surface.

41. The combination as set forth in claim 37 further characterized in that said first carriage travels along a way extending generally parallel to one of said two orthogonally disposed coordinate axes;

said first carriage including a docking assembly comprised of a generally L-shaped member moveable relative to the remaining portion of said first carriage between a raised and lowered position;

said generally L-shaped member being defined by a vertical portion and a horizontal portion connected to one another at a right angle;

said vertical portion having means cooperating with correspondingly shaped means formed on said first carriage for constraining said L-shaped member against lateral movement as it moves between its upper and lower most positions.

42. The combination as set forth in claim 41 further characterized in that said docking assembly further includes said locating means;
   said locating means includes a slide plate supported for movement above on said horizontal portion of said L-shaped member;
   said slide plate carrying a plurality of suction elements depending from it and extending below said horizontal portion of said L-shaped member; and
   wherein said slide plate is connected to said generally L-shaped member through the intermediary of a follower means.

43. The combination as set forth in claim 42 further characterized in that said support surface is part of a platen and is generally rectangular and oriented is lengthwise along said one of said two generally orthogonally oriented axes;
   said platen including a side abutment wall positioned generally adjacent the leading edge of said support surface; and
   wherein said platen further includes a moveable stop located along said support surface leading edge and providing an abutment surface extending generally parallel to the other of said two orthogonally oriented axes such that when taken a from the first means the moveable stop and the side wall are located at the right corner of the platen thereby right justifying the media sheet advanced onto the support surface by the loading means.

44. The combination as set forth in claim 43 further characterized in that said horizontal portion of said L-shaped member has a plurality of pin members extending upwardly therefrom;
   said slide plate includes plurality of generally square openings formed therein and located in said slide plate so as to be oriented generally coincidentally with a corresponding one of said plurality of pins;
   each of said pins extending upwardly through and beyond an associated one of said plurality of generally square openings to provide a retaining portion thereon; and
   wherein the retaining portion of each of said pins being connected to said slide plate through the intermediary of a tension spring.

45. The combination as set forth in claim 44 further characterized in that said follower means further includes a horizontally disposed actuator connected at one end to the horizontal portion of the L-shape member and at its other end two a depending pin slideably engaging within a slot formed in and along said horizontal portion of said L-shape member;
   said slot being disposed generally parallel to the other of said two orthogonally oriented axes; and
   wherein said slide plate includes a generally triangularly shaped opening having a cam surface forming one side of the triangular shape and receiving said depending pin therein for coaction therewith.

46. The combination as set forth in claim 45 further characterized in that at least one of said plurality of pins extending upwardly from said horizontal portion of said L-shaped member is connected to said slide plate by two tension springs each oriented in coincidence with said orthogonally oriented axes such that when the horizontal actuator is in its retracted position, the pin is caused to be camped against said cam surface of the triangularly shaped opening formed in the slide plate thereby causing the slide plate to be maintained in a retracted condition and when the actuator is extended the depending pin it is caused to be somewhat released from this camming relationship thereby allowing the slide plate to be extended along each coordinate axis.

47. The combination as set forth in claim 37 further characterized in that the leading edge of said support surface when positioned at said second location being generally coincident with a datum extending generally along the other of said two orthogonally disposed coordinate axes;
   said datum being aligned with a line along which a light beam is projected.

48. The combination as set forth in claim 47 further characterized in that said support surface presents a given area for supporting an article in sheet form thereon;
   said datum being located on said surface proximate said leading edge of said support surface yet is spaced from it by a first given margin;
   said given area is further limited by two side margins extending generally parallel to one another and extend generally orthogonally to the datum to a defined net work area on said workpiece support surface along which said beam path is projected; and
   wherein each media sheet is handled along portions corresponding to the position of the first given margin and one of said two side margins as delimited on said workpiece support surface.

49. The combination as set forth in claim 34 further characterized in that at least one of said first and second means includes a locking mechanism for drawing a cassette into a receptacle and locking it against movement therein, said mechanism including:
   a substantially planar cassette support surface for supporting a cassette thereon;
   a receiving means positioned relative to said cassette support surface for receiving a complementary sized and shaped engagement member carried by the cassette;
   an abutment positioned above said cassette support surface and spaced from said receiving means to provide a stop against which a portion of the cassette is drawn;
   actuator means drivingly connected to said receiving means for articulating said receiving means between a first position wherein the engagement member on the said casette is capable of being received therein and a second position wherein the engagement means on the casette is locked therein and moved toward the abutment to cause the portion of the cassette to be drawn against the abutment and held in engagement therewith.

50. The combination as set forth in claim 49 further characterized in that said first means includes a locking mechanism for drawing a cassette into a receptacle and locking it against movement therein, said first means further including a means for discharging paper sheets which may be placed between articles in a cassette, said paper discharging means including an endless drive belt mounted to said base for both vertical and horizontal movement about a plurality of rollers and a drive means for causing said belt to rotate about said rollers.

51. The combination as defined in claim 49 further characterized in that receiving means includes a rotatable drive means;

said rotatable drive means including two spaced apart wheels each being rotatably supported below said cassette support surface by journaling means depending therefrom;

each of said drive wheels being rotatably coupled to one another by a shaft for simultaneously moving each of said receiving means between said first and second positions; and wherein said shaft is eccentrically coupled to said actuator means such that said actuator in moving between an extended and a retracted position causes rotational movement of said receiving means between said first and said second positions.

52. The combination as defined in claim 51 further characterized in that said receiving means includes an involute cutout formed in each of said wheels;

each of said cutouts having a neck portion and a base portion connected to one another by a leading and a trailing portion;

said neck portion being slightly larger in size than said width of the engagement member, said involute cutout widening from said neck portion toward said base portion proceeding along each of said leading and trailing portions.

53. The combination as defined in claim 52 further characterized in that interposed between said support surface and said casette is a guide means extending in a direction towards the abutment so as to locate the engagement member carried by the cassette within the cutouts formed in each of the wheels when said wheels are in said first position.

54. The combination as defined in claim 53 further characterized in that said cassette includes a cover slidably mounted to it; and wherein said cover being releasably locked to said cassette by a trip block assembly normally biassed upwardly towards the cover and located at the edge of the cassette which faces the abutment.

55. The combination as defined in claim 54 further characterized in that extending upwardly relative to said cassette support surface is an inclined flange cooperating with said trip block assembly such that as the drive wheels rotate from said first position to said second position the inclined flange simultaneously engages with the trip block assembly to cause it to move downwardly and to release the cover from a locked condition with said cassette.

56. The combination as defined in claim 55 further characterized in that said trip block assembly includes a trip block slidably mounted on a support member extending from beneath said cassette;

said support member having at least one upstanding guide member along which the trip block moves between a raised position and a lowered position;

said trip block having a pin extending through upwardly and beyond an opening formed in the casette and received within an opening in the cover when the cover and the casette are locked such that upon engagement with said inclined flange the trip block is caused to move downwardly thereby moving said pin along with it.

57. The combination as defined in claim 56 further characterized by control means associated with said actuator means to cause said wheels to be rotated in either direction;

said control means further including a sensor for determining the presence of a cover on said cassette such that said controller causes the casette to be driven away from said abutment and out of locking engagement therewith upon the presence of such condition.

58. A method for advancing material in sheet form from one position along a given path to another position remote from said one position, along which path said article undergoes a work operation, said method comprising;

providing a supply means containing a plurality of media in sheet form and locating said supply means at one end of the media travel path;

providing a collecting means for collecting media after a work operation has been performed on it and locating it at the other opposite end of said travel path;

providing a support surface movable along said path between positions generally adjacent said supply means and said collecting means;

providing said support surface with registration means associated with it for orienting one of said plurality of articles in registration with two orthogonally oriented axes;

providing means as part of said loading means for yieldably holding one of said plurality of articles to said loading means and for cooperating with said registration means associated with said support surface such that one of said plurality of articles becomes automatically aligned in a given orientation along each of said two orthogonally disposed axes as the loading means advances one of said plurality of articles onto the support surface and into engagement with said registration means from the position located generally adjacent said one side of said support surface; and providing a loading means for advancing a media sheet from said supply means onto said support surface;

providing an off-loading means for moving said media sheet from said support surface and onto said collecting means;

moving said support surface to the position adjacent said supply means and utilizing said loading means to pull a media sheet from said supply means and to advance it onto said support surface such that said media sheet is automatically located on said workpiece support surface in registration with a given orientation;

conducting a work operation on the workpiece while being supported on said support surface;

moving said support surface to said position adjacent said collecting means after said work operation is conducted on the involved media sheet; and utilizing said off-loading means to advance the involved media sheet off of the support surface and into said collecting means.

59. A method as defined in claim 58 further characterized in that said loading means is provided with lifting means capable of releasably holding the uppermost one of the media sheets contained in said supply means in a lifted condition; and wherein the topmost one of said media sheet in said supply means is moved upwardly by said lifting means in said lifted condition while the work operation is being conducted on the preceding media sheet supported on said workpiece support surface.

60. A method as defined in claim 59 further characterized in that said movable support surface is part of a platen movable in one of two orthogonally oriented directions;
- providing said movable support surface with a plurality of pin holes arranged thereabout;
- providing an air moving means for moving air through said pin holes in either direction;
- moving air through said pin holes from the interior of said platen to the external environment when said loading means is moving the involved media sheet from said supply means and onto the workpiece support surface.

61. A method as defined in claim 60 further characterized in that said loading means includes locating means having means for yieldably placing a corner of the media sheet carried by it in registration with each of said two orthogonally oriented directions;
- moving the involved media sheet from said supply means toward a final position adjacent a leading edge of the platen; and
- actuating said locating means to yieldably place the corner of the involved media sheet in said registration after said loading means has moved through its total length of travel.

62. A method as defined in claim 61 further characterized by reversing the direction of air flow through the pin holes formed in the support surface after said locating means has been actuated to thereby draw the media sheet down onto said support surface in registration with the two orthogonally oriented directions; and
- wherein the direction of air flow through the pin holes in the support surface is reversed when the off-loading means is caused to move the involved media sheet from the support surface and into the collecting means.

63. A method as defined in claim 62 further characterized in that said lifting means and said locating means include a plurality of suction elements vertically movable into and out engagement with a media sheet disposed below it;
- providing suction elements on said unloading means for engagement with said media sheet;
- sensing the pressure to each of said vacuum elements in order to determine whether a seal has been created; and
- using the sensed pressure to establish whether the supply of sheet media has been depleted.

64. A method as defined in claim 63 further characterized by designating a time interval by which the seal should be created between each of said suction elements and said media sheet; and
- stopping the movement of said loading means until such sealing engagement is determined.

65. A method as defined in claim 58 further characterized by providing a light tight cover around said given path;
- providing a first opening in said cover communicating with said supply means and a second opening in said cover communicating with said collecting means;
- providing a light tight cassette containing a plurality of media sheets therein and inserting said cassette through said first opening and into said supply means; and
- locking the cassette against movement within the supply means and subsequently removing the cover on the cassette without introducing light into the internal confines of said cover.

66. A method as defined in claim 65 further characterized by providing a sensor at said collecting means for sensing the presence of a cover on a cassette when a cassette is in placed therein;
- locking a cassette in said collecting means during the advancement of media sheets from the supply means to the collecting means; and
- inserting a cover over the cassette maintained within the collecting means after advancement of the media sheets has taken place and sensing the presence of said cover on said cassette by interrogating said sensor and subsequently releasing said cassette from its locked condition after determining that a cover has been secured over it.

67. An article handling system for moving an article along a path of travel from an initial position to a final position, said system comprising:
- a base;
- a support surface supported by said base:
- loading means associated with one side of said support surface and supported for movement above said surface for advancing one of a plurality of articles onto said support surface from a position located generally adjacent said one side of said surface;
- said loading means further including a means for automatically advancing said one of said plurality of articles onto said support surface so as to position it thereon in a preselected orientation in registration with two orthogonally oriented axes;
- off-loading means associated with the other side of said support surface for advancing said one of said plurality of articles from the support surface and to a next location oriented on the other side of the of the support surface;
- control means for coordinating the movements of said loading means and said off-loading means relative to one another to successively advance articles onto and off said support surface and for automatically effecting registration of an article being advanced in said given orientation on said support surface;
- said support surface is moveable relative to said base between a first location and a second location;
- said first location is associated with the one side of said support surface and said second location is associated with the other side of the support surface;
- said means for automatically advancing said one of said plurality of articles onto said support surface in a preselected orientation includes means for yieldably moving the involved article in directions parallel to each of said two coordinate axes;
- a first receptacle means being associated generally adjacent said first location for providing a means for containing said plurality of articles to be advanced through the system;
- a second receptacle means being associated generally adjacent said second location for providing means for collecting said plurality of articles after being advanced from the support surface;
- said loading means includes a first carriage and a docking assembly carried by it and moveable in a direction along one of said orthogonally oriented axes;
- said support surface being further defined by a leading edge facing said second receptacle means;

the range of travel of said first carriage extends from a position over said first receptacle means to a position generally adjacent the leading edge of said support surface when said work surface is at its first location;

said off-loading means includes a second carriage moveable along said one of said two orthogonally oriented axes for advancing an article from the support surface and into said second receptacle means;

said second carriage having a range of travel extending generally from adjacent the leading edge of said support surface when said support surface is moved to its second location, to a position located generally adjacent the end of said second receptacle means disposed remotely of said table;

said loading means includes a support system for holding it above said first receptacle means and said support surface;

said loading means further including a plurality of lifting members secured to said support system and arranged adjacent the end of said first receptacle means disposed adjacent to;

said lifting members each being comprised of a body portion connected to said support system and moveable suction element capable of being moved downwardly into engagement with an article oriented below it from a normally raised position located adjacent the support;

said support surface comprises part of a platen moveable between said first and second locations along said one of said two orthogonally disposed axes;

said support surface further including a plurality of pin holes formed in it and extending generally about the area presented by said support surface; and wherein said system further includes an air moving means connected to said platen for moving air in either direction through said plurality of pin holes formed in said support surface.

68. An article handling system for moving an article along a path of travel from an initial position to a final position, said system comprising:
a base;
a support surface supported by said base:
loading means associated with one side of said support surface and supported for movement above said surface for advancing one of a plurality of articles onto said support surface from a position located generally adjacent said one side of said surface;
said loading means further including a means for automatically advancing said one of said plurality of articles onto said support surface so as to position it thereon in a preselected orientation in registration with two orthogonally oriented axes;
off-loading means associated with the other side of said support surface for advancing said one of said plurality of articles from the support surface and to a next location oriented on the other side of the of the support surface;
control means for coordinating the movements of said loading means and said off-loading means relative to one another to successively advance articles onto and off said support surface and for automatically effecting registration of an article being advanced in said given orientation on said support surface;

said support surface is moveable relative to said base between a first location and a second location;
said first location is associated with the one side of said support surface and said second location is associated with the other side of the support surface;
said means for automatically advancing said one of said plurality of articles onto said support surface in a preselected orientation includes means for yieldably moving the involved article in directions parallel to each of said two coordinate axes;
a first receptacle means being associated generally adjacent said first location for providing a means for containing said plurality of articles to be advanced through the system;
a second receptacle means being associated generally adjacent said second location for providing means for collecting said plurality of articles after being advanced from the support surface;
said system including a covering means for light-tight covering of the system while an article is being advanced through it;
said covering has a first opening corresponding generally to the position of said first receptacle means and a second opening corresponding generally to the position of said second receptacle means;
said first receptacle means includes a supply casette in which is contained said plurality of articles in sheet form;
said supply casette being correspondingly sized to be received within said first opening formed in said cover and said first receptacle means having means for locking said supply casette in engagement with it;
the first opening formed in said cover further includes a light-tight seal engaging with the supply casette when it is inserted into said first receptacle means;
said first receptacle means includes a stationary surface for supporting the supply cassette thereon and a locking means associated therewith;
said locking means including at least one wheel drivingly connected with one another below the stationary surface such that a portion of each wheel extends upwardly beyond it;
said at least one wheel having an involute cutout formed in it and moveable between a generally vertical orientation and one generally coincident with the mounting surface; and
wherein the supply casette includes an engagement means cooperating with each of said involute shapes for selectively locking the cassette in said first receptacle means.

69. In a photoplotter of the type which creates graphic information on photosensitive media in sheet form, a system for advancing media through the photoplotter, said system comprising;
a base;
a first means supported by said base for providing a plurality of media sheets to be moved through the photoplotter;
a platen having a work piece support surface supported by said base and being sufficiently sized to support a media sheet placed upon it;
a second means supported by said base for collecting said media sheets after being advanced off said platen;
loading means supported for movement between said first means and said support surface for advancing a media sheet from said first means and onto said support surface;

said loading means further including locating means for automatically positioning the involved media sheet on said workpiece support surface in precise registration with a given orientation;

off-loading means supported for movement between said support surface and second means for carrying the involved media sheet off the support surface of the platen and into said second means;

control means for coordinating the movements of said loading means and said off-loading means to effect advancement of a media sheet from the first means onto said support surface in precise registration with said given orientation and for causing said off-loading means to advance the involved media sheet off the support surface and into said second means;

said support surface is moveable relative to said base between a first location and a second location;

said first location is associated with one side of said support surface and said second location is associated with the other side of the support surface;

said locating means includes means for yieldably orienting the involved media sheet in registration with two orthogonally oriented axes;

said support surface comprises part of a platen moveable between said first and second locations along said one of said two orthogonally orientated axes;

said support surface further including a plurality of pin holes formed in it in extending generally about the area presented by said support surface; and wherein said system further includes an air moving means connected to said platen for moving air in either direction through said plurality of pin holes formed in said support surface.

70. In a photoplotter of the type which creates graphic information on photosensitive media in sheet form, a system for advancing media through the photoplotter, said system comprising;

a base;

a first means supported by said base for providing a plurality of media sheets to be moved through the photoplotter;

a platen having a work piece support surface supported by said base and being sufficiently sized to support a media sheet placed upon it;

a second means supported by said base for collecting said media sheets after being advanced off said platen;

loading means supported for movement between said first means and said support surface for advancing a media sheet from said first means and onto said support surface;

said loading means further including locating means for automatically positioning the involved media sheet on said workpiece support surface in precise registration with a given orientation;

off-loading means supported for movement between said support surface and second means for carrying the involved media sheet off the support surface of the platen and into said second means;

control means for coordinating the movements of said loading means and said off-loading means to effect advancement of a media sheet from the first means onto said support surface in precise registration with said given orientation and for causing said off-loading means to advance the involved media sheet off the support surface and into said second means;

said support surface is moveable relative to said base between a first location and a second location;

said first location is associated with one side of said support surface and said second location is associated with the other side of the support surface;

said loading means includes means for yieldably orienting the involved media sheet in registration with two orthogonally oriented axes;

said first means being associated generally adjacent said first location for providing a means for containing said plurality of media sheets to be advanced through the system;

a said second means being associated generally adjacent said second location for providing means for collecting said plurality of articles after being advanced from the support surface;

said loading means includes a first carriage and a docking assembly carried by it and moveable in a direction along one of said orthogonally oriented axes;

said support surface being further defined by a leading edge facing said second means;

the range of travel of said first carriage extends from a position over said first means to a position generally adjacent the leading edge of said support surface when said work surface is moved to the first location;

said first carriage travels along a way extending generally parallel to one of said two orthogonally disposed coordinate axes;

said first carriage including a docking assembly comprised of a generally L-shaped member moveable relative to the remaining portion of said first carriage between a raised and lowered position;

said generally L-shaped member being defined by a vertical portion and a horizontal portion connected to one another at a right angle; and said vertical portion having mans cooperating with correspondingly shaped means formed on said first carriage for constraining said L-shaped member against lateral movement as it moves between its upper and lower most positions.

71. A method for advancing material in sheet form from one position along a given path to another position remote from said one position, along which path said article undergoes a work operation, said method comprising;

providing a supply means containing a plurality of media in sheet form and locating said supply means at one end of the media travel path;

providing a collecting means for collecting media after a work operation has been performed on it and locating it at the other opposite end of said travel path;

providing a support surface movable along said path between positions generally adjacent said supply means and said collecting means;

providing a loading means for advancing a media sheet from said supply means onto said support surface;

providing an off-loading means for moving said media sheet from said support surface and onto said collecting means;

moving said support surface to the position adjacent said supply means and utilizing said loading means to advance a media sheet from said supply means and onto said support surface such that said media sheet is automatically located on said workpiece support surface in registration with a given orientation;

conducting a work operation on the workpiece while being supported on said support surface;

moving said support surface to said position adjacent said collecting means after said work operation is conducted on the involved media sheet;

utilizing said off-loading means to advance the involved media sheet off of the support surface and into said collecting means;

said loading means is provided with lifting means capable of releasably holding to the uppermost one of the media sheets contained in said supply means in a lifted condition;

the topmost one of said media sheet in said supply means is moved upwardly by said lifting means in said lifted condition while the work operation is being conducted on the preceding media sheet supported on said workpiece support surface;

said movable support surface is part of a platen movable in one of two orthogonally oriented directions;

providing said movable support surface with a plurality of pin holes arranged thereabout;

providing an air moving means for moving air through said pin holes in either direction; and moving air through said pin holes from the interior of said platen to the external environment when said loading means is moving the involved media sheet from said supply means and onto the workpiece support surface.

* * * * *